United States Patent
Liden et al.

(10) Patent No.: US 9,390,282 B2
(45) Date of Patent: Jul. 12, 2016

(54) OUTSOURCING DOCUMENT-TRANSFORMATION TASKS WHILE PROTECTING SENSITIVE INFORMATION

(71) Applicant: MICROSOFT TECHNOLOGY LICENSING, LLC, Redmond, WA (US)

(72) Inventors: Lars H. Liden, Seattle, WA (US);
Daniel J. Driscoll, Seattle, WA (US);
Andres F. Monroy-Hernandez, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 51 days.

(21) Appl. No.: 14/475,964

(22) Filed: Sep. 3, 2014

(65) Prior Publication Data
US 2016/0063269 A1 Mar. 3, 2016

(51) Int. Cl.
*G06F 21/60* (2013.01)
*G06F 21/62* (2013.01)
*G06Q 10/10* (2012.01)

(52) U.S. Cl.
CPC ............ *G06F 21/6218* (2013.01); *G06F 21/60* (2013.01); *G06F 21/6245* (2013.01); *G06Q 10/101* (2013.01)

(58) Field of Classification Search
CPC .......... G06F 21/41; G06F 21/60; G06F 21/31
See application file for complete search history.

(56) References Cited

U.S. PATENT DOCUMENTS

| 6,978,367 | B1  | 12/2005 | Hind et al. |
| 7,003,800 | B1* | 2/2006  | Bain ................... G06F 21/6209 |
|           |     |         | 713/183 |
| 8,001,607 | B2  | 8/2011  | Stull et al. |
| 8,108,689 | B2  | 1/2012  | Nicolson et al. |

(Continued)

FOREIGN PATENT DOCUMENTS

EP 1850263 A1 10/2007

OTHER PUBLICATIONS

Greenway, Mateen, "Data Obfuscation—managing data privacy in development and test environments," available at <<http://www.ncc.co.uk/article/?articleid=15506>>, National Computing Centre, IT adviser, Issue 59, 2009, 3 pages.

(Continued)

*Primary Examiner* — Izunna Okeke
*Assistant Examiner* — Ali Shayanfar
(74) *Attorney, Agent, or Firm* — Steve Wight; Sandy Swain; Micky Minhas

(57) ABSTRACT

An outsourcing environment is described herein by which an outsourcing entity may delegate document-transformation tasks to at least one worker entity, while preventing the worker entity from gaining knowledge of sensitive items that may be contained within a non-obfuscated original document (NOD). In one example, the environment may transform the NOD into an obfuscated original document (OOD) by removing sensitive items from the NOD. The worker entity may perform formatting and/or other document-transformation tasks on the OOD, without gaining knowledge of the sensitive items in the NOD, to produce an obfuscated transformed document (OTD). The environment may then allow for the outsourcing entity to view a content-restored version of the OTD.

20 Claims, 13 Drawing Sheets

(56) References Cited

U.S. PATENT DOCUMENTS

| | | | |
|---|---|---|---|
| 8,117,221 B2 | 2/2012 | Elteto et al. | |
| 8,355,923 B2 | 1/2013 | Gervais et al. | |
| 8,649,552 B2 | 2/2014 | Balakrishnan et al. | |
| 8,677,149 B2 | 3/2014 | Yun et al. | |
| 9,253,639 B1* | 2/2016 | Lafuente | H04W 12/06 |
| 9,300,645 B1* | 3/2016 | Rao | H04L 63/08 |
| 2005/0183072 A1* | 8/2005 | Horning | G06F 21/14 |
| | | | 717/140 |
| 2005/0251865 A1* | 11/2005 | Mont | G06F 21/6245 |
| | | | 726/26 |
| 2009/0147958 A1 | 6/2009 | Calcaterra et al. | |
| 2010/0306854 A1 | 12/2010 | Neergaard | |
| 2011/0179011 A1 | 7/2011 | Cardno et al. | |
| 2011/0246787 A1* | 10/2011 | Farrugia | G06F 21/60 |
| | | | 713/189 |
| 2012/0030165 A1 | 2/2012 | Guirguis et al. | |
| 2012/0272329 A1 | 10/2012 | Grammer et al. | |
| 2012/0317239 A1* | 12/2012 | Mulder | G06Q 10/101 |
| | | | 709/219 |
| 2013/0145471 A1* | 6/2013 | Richard | G06F 21/564 |
| | | | 726/24 |
| 2013/0262862 A1* | 10/2013 | Hartley | G06F 21/602 |
| | | | 713/165 |
| 2014/0019756 A1* | 1/2014 | Krajec | H04L 63/0428 |
| | | | 713/167 |
| 2014/0173503 A1* | 6/2014 | Catania | G06F 17/30905 |
| | | | 715/781 |
| 2014/0304395 A1* | 10/2014 | Chandrayana | H04L 29/08072 |
| | | | 709/224 |
| 2015/0007265 A1* | 1/2015 | Aissi | G06F 21/60 |
| | | | 726/3 |
| 2015/0278534 A1* | 10/2015 | Thiyagarajan | G06Q 30/016 |
| | | | 726/28 |

OTHER PUBLICATIONS

"International Search Report & Written Opinion Issued in PCT Application No. PCT/US2015/047634", Mailed Date: Nov. 11, 2015, 12 Pages.

"Understanding and Selecting Data Masking Solutions: Creating Secure and Useful Data", Published on: Jan. 1, 2012 Retrieved From <<https://securosis.com/assets/library/reports/UnderstandingMasking_FinalMaster_V3.pdf>>.

Bakken, et al., "Data Obfuscation: Anonymity and Desensitization of Usable Data Sets", In IEEE Security & Privacy, vol. 2, Issue 06, Nov. 1, 2004, pp. 34-41.

Cera, et al., "Role-Based Viewing Envelopes for Information Protection in Collaborative Modeling", In Computer-Aided Design, vol. 36, Issue 9, Aug. 1, 2004, pp. 873-886.

Chen, et al., "Fine-grained Access Control for Digital Image Systems", In International Conference on Information Science, Electronics and Electrical Engineering, vol. 2, Apr. 26, 2014, pp. 681-685.

* cited by examiner

OUTSOURCING DOCUMENT-TRANSFORMATION TASKS WHILE PROTECTING SENSITIVE INFORMATION

BACKGROUND

An author may create a document having information that is suitable for consumption by some readers, but not others. For example, a medical record may contain sensitive information regarding patients; in many jurisdictions, the law may prevent the author from divulging the sensitive information to non-authorized individuals. To address this issue, the author may choose to obfuscate sensitive items within the document, to produce an obfuscated or "sanitized" document. Obfuscation may constitute removing the sensitive items, and possibly replacing the sensitive items with dummy items having no sensitive content (e.g., by replacing an actual patient name with the fictional name "John Doe"). The author may then distribute the obfuscated document to appropriate recipients. To complete the transaction, the recipients may read or analyze the obfuscated document in accordance with different application-specific objectives. In this context, the recipients operate as "endpoint consumers" of the obfuscated document, and the transactions may be characterized as "one way," e.g., proceeding from the author to the consumer.

While generally effective for its intended purpose, the above-summarized strategy is designed for only one kind of transaction involving the dissemination of documents. The strategy may not be well suited for other, more complex, transactions.

SUMMARY

An outsourcing environment is described herein by which an outsourcing entity can collaborate with a worker entity in the course of the development of a final document, without divulging sensitive information to the worker entity that may be contained within the document, in its non-obfuscated original form.

From the standpoint of the outsourcing entity, the environment may operate by: (a) providing a non-obfuscated original document (NOD) having one or more sensitive items contained therein; (b) obfuscating the sensitive items in the NOD to produce an obfuscated original document (OOD) containing obfuscated items; (c) providing the OOD to the worker entity; (d) receiving an obfuscated transformed document (OTD) from the worker entity, the OTD containing at least one change to the OTD, made by the worker entity, which contributes to the development of the final document; and (e) de-obfuscating the OTD by restoring the obfuscated items to their corresponding sensitive items, to produce a content-restored transformed document (CTD). In one case, for example, the worker entity can produce the OTD by making formatting-type changes to the OOD which do not affect the information-bearing content of the NOD.

The above approach can be manifested in various types of systems, devices, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative environment for outsourcing document-transformation tasks to worker entities in a secure manner, that is, without disclosing sensitive information to the worker entities that may be contained in documents, in their original forms. Section B sets forth illustrative methods which explain the operation of the environment of Section A. Section C describes illustrative computing functionality that can be used to implement any aspect of the features described in Sections A and B.

Figure 14:
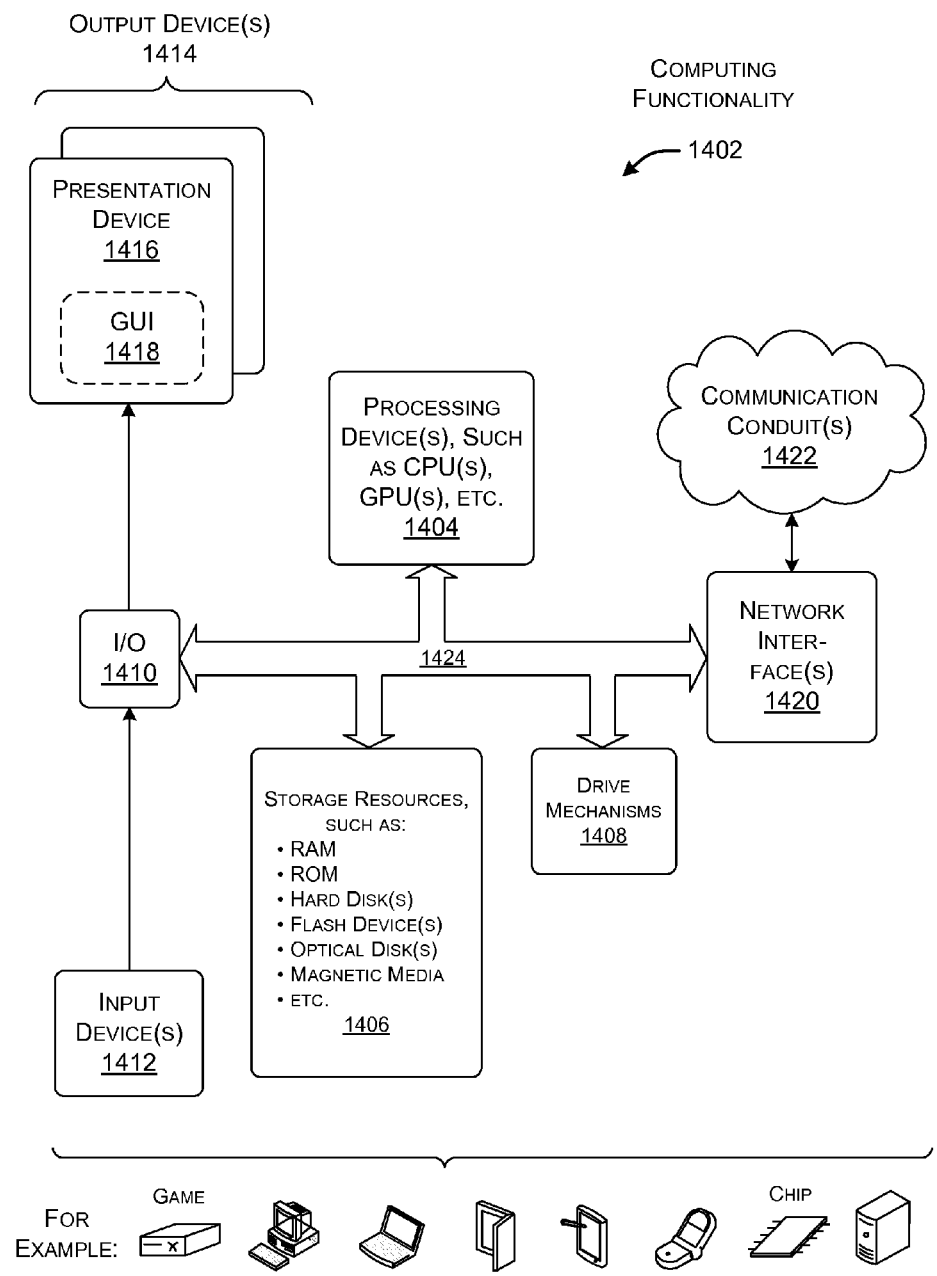
FIG. 14 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 14, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Environment

Figure 1:
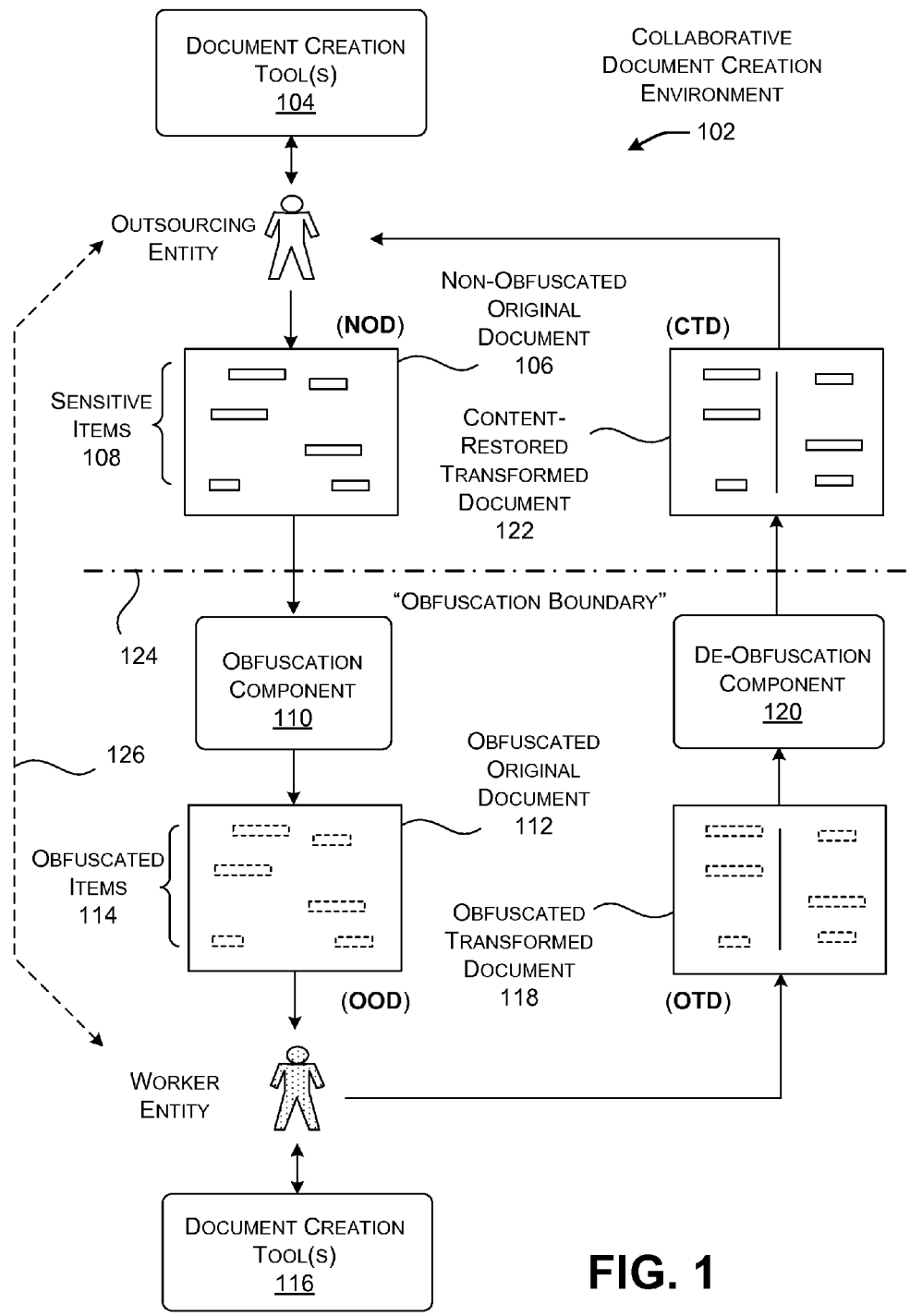
FIG. 1 shows an overview of an environment for outsourcing document-transformation tasks performed on documents while protecting sensitive information contained in the documents.

FIG. 1 shows an overview of an environment 102 for outsourcing document-transformation tasks in a secure manner. That is, the environment 102 provides functionality which allows at least one outsourcing entity and least one worker entity to collaborate in the production of a final document of any type (examples of which are provided below). Further, the environment 102 provides functionality that ensures that any sensitive content in a document that is being created is accessible to the outsourcing entity, but not the worker entity. As such, the outsourcing entity can delegate document-transformation tasks to the worker entity without the worker entity gaining knowledge of the sensitive content. The outsourcing entity may want to prevent the worker entity from learning of the sensitive content because the worker entity is not authorized to consume that information, and/or for any other application-specific reason(s).

In one case, the outsourcing entity and the worker entity may correspond to two human participants in the document creation process. Generally, the worker entity operates as a co-creator with respect to the outsourcing entity. For example, in one case, the worker entity may correspond to an agent of the outsourcing entity who carries out the instructions of the outsourcing entity. Alternatively, or in addition, the worker entity may exercise his or her independent judgment in modifying the document, based on guidance provided by the outsourcing entity having any level of specificity, or perhaps based on no guidance from the outsourcing entity. For instance, towards the permissive end of the guidance spectrum, the outsourcing entity may simply ask the worker entity to improve the document in any manner deemed appropriate by the worker entity. Any type of agreement or understanding may determine the nature of the relationship between the outsourcing entity and the worker entity. In some cases, the worker entity performs work for the outsourcing entity for a fee. In other cases, the worker entity performs the work for "free," e.g., as when the worker entity and the outsourcing entity correspond to employees of the same organization.

In other cases, the worker entity may represent an automated agent, such as a computer program, that carries out tasks in response to instructions from the outsourcing entity, with or without the supervision of a human worker. However, to facilitate and simplify explanation, it will henceforth be assumed that both the outsourcing entity and the worker entity represent human participants of the document creation process.

Overall, FIG. 1 represents a temporal series of operations performed on a document by the outsourcing entity and the worker entity, culminating in the production of a final document. At an initial stage, the outsourcing entity may use one or more document creation tools 104 (referred to in the singular below) to create a non-obfuscated original document (NOD) 106. For example, the document creation tool 104, or some other source of the NOD 106, may produce the NOD 106 using a word processing application, a graphics application, an image capture and/or editing application, a video capture and/or editing application, a slide deck generation application, a web page editing tool, and so on, or any combination thereof. In addition, or alternatively, the document creation tool 104 may represent a mechanism for acquiring an already-created document, such as a scanner for scanning an already-existing document or photograph, etc., or a mechanism for retrieving the NOD 106 from a local and/or remote data store or other source(s).

In whatever manner produced, the NOD 106 may encompass any type(s) of content and may have any organizational structure (including no structure). For example, the NOD 106 may contain any combination of alphanumeric content, image content, video content, graphics content, raw data, etc. In the particular case in which the NOD 106 represents a web page or a portion of a web page, the NOD 106 may also contain presentation-related markup content (e.g., HyperText Markup Language content, Cascading Style Sheets content, etc.), executable content (e.g., JavaScript® code, Python® code, etc.), and so on. In other cases, a document may include two or more parts having the same type, or different respective types. For example, a document may correspond to a master document that encompasses plural component documents or sections; these component parts can have the same type or different respective types.

More generally, at this stage in the development process, the NOD 106 represents an "in-progress" document having any state of completion, providing that the state is not yet final. In one example, for instance, the outsourcing entity may generate the raw text of a document, and the worker entity may perform formatting on that document; here, the document prepared by the outsourcing entity is not yet final because the formatting has not yet been completed.

The NOD 106 further contains sensitive information in the form of one or more sensitive items 108. Sensitive information represents any content that the worker entity is not permitted to consume, for any application-specific reason(s). For example, the sensitive information in the NOD 106 may correspond to all of the alphanumeric content of the NOD 106. In another case, the sensitive information may correspond to all (or some) entity names in the NOD 106, and/or all (or some) numeric values in the NOD 106, and so on. No limitation is placed on what content items may be considered "sensitive" in a particular environment.

At this point in the outsourcing process, the NOD 106 exposes the sensitive information that it contains. In other words, the sensitive information has not yet been obfuscated, such that any person who retrieves the document can examine the sensitive information (that is, assuming that the NOD 106 is not encrypted or otherwise protected).

In the next stage in the development process, the environment 102 uses an obfuscation component 110 to obfuscate the sensitive items 108 in the NOD 106, to produce an obscured original document (OOD) 112. The OOD 112 contains obfuscated items 114 which represent the obfuscated counterparts of the sensitive items 108 in the NOD 106. As the term is used herein, an obfuscated item represents any information that operates as a substitution for a sensitive item and which conceals the actual information-bearing content of the sensitive item. The obfuscation component 110 can use one or more automatic and/or manual techniques for identifying sensitive items in the NOD 106 that are to be replaced, as will be described below in greater detail in connection with the explanation of FIG. 6. Further, the obfuscation component 110 can use one or more techniques to produce the obfuscated items 114 once they are found, as will be described in greater detail below in connection with the explanation of FIG. 9.

As will be clarified below, the obfuscation component 110 can also assist the outsourcing entity in obfuscating the NOD 106 by providing one or more tools that allow the outsourcing entity to verify that all sensitive items in the NOD 106 that were intended to be obfuscated have, in fact, been obfuscated. Representative verification tools are described below in connection with the explanation of FIG. 6.

Next, the worker entity may use at least one document creation tool 116 (referred to in the singular below) to make at least one change to the OOD 112, yielding an obscured transformed document (OTD) 118. Each such change transforms the document, and represents a contribution to the overall task of producing a final document. More specifically, in a first type of change, the worker entity changes the manner in which information is presented in the OOD 112, but without affecting the underlying information itself. In a second type of change, the worker entity adds at least one content item to the OOD 112, but again, without modifying the original information that appears in the OOD 112. But in a third type of change, the environment 102 may allow the worker entity to alter the information-bearing content of the information in the OOD 112, at least to some extent. Other types of changes may represent hybrids of the above three types of changes.

Consider the following illustrative examples to clarify the nature of the operations that may be performed by the worker entity. In one case, the worker entity alters the format of the OOD 112. For example, the worker entity can change the spatial arrangement of content in the OOD 112, the size and style font of textual information within the OOD 112, and so on. In some cases, the worker entity can make a format-type change using appropriate formatting tools provided by a document editing program. Alternatively, in those cases in which the OOD 112 represents a page that is destined to become a web page (or portion thereof), the worker entity can make a format-type change by modifying the presentation-related markup content associated with the OOD 112, e.g., by modifying the HTML associated with the web page.

In another case, the worker entity transforms the OOD 112 by adding a background image to the OOD 112. Or the worker entity can add a stock image to the OOD 112, at a particular location in the OOD 112 selected by the outsourcing entity, e.g., to illustrate a point that is being made by textual information in the OOD 112.

In another case, the worker entity produces a program that will accompany the OOD 112 and which affects the manner in which the OOD 112 presents its information. For example, the worker entity can produce a script-type program which filters data items associated with the OOD 112 according to some specified factor or factors. Alternatively, or in addition, in those cases in which the OOD 112 represents a page that is destined to become a web page, the worker entity may add code (e.g., JavaScript® code, etc.) which affects the functionality of the web page, e.g., by adding code which governs the manner in which the page responds to mouse clicks and mouse hovers by an end user, etc.

In another case, the worker entity may make a change that affects the overall character or classification of the document itself. For example, the outsourcing entity may create a conventional document using a word processing application. The worker entity may transform the document into a web page, e.g., by adding appropriate HTML, JavaScript® code, etc. to the document. In yet other cases, the worker entity may only use the OOD 112 as guidance in creating a separate new document, rather than literally operating on the information associated with the OOD 112 itself. In this context, the worker entity can be said to "transform" the OOD 112 in a more figurative and indirect sense compared to the examples provided above.

In another case, the worker entity can create a visual presentation to depict a set of data items associated with the OOD 112. For example, the worker entity can organize the data items in the set in a chart of any type, a graph of any type, and so on. The worker entity can produce such a change in a manual fashion, e.g., by using the tools provided by a chart-generating application, a graph-editing application, etc. Or the worker entity can produce a program (as described in the preceding paragraph) that, when run, will produce the desired visual depiction of the data items.

The above-types of changes do not affect information-bearing content of the information that is present in the OOD 112. For example, the above-types of changes do not alter the words or symbols in the OOD 112 in a manner that would change the semantic content of the OOD 112. Indeed, the environment 102 may enforce this constraint on the worker entity's changes by preventing the worker entity from modifying original information that appears in the OOD 112, e.g., by preventing the worker entity from modifying the characters of the words in the OOD 112, the order of the words in sentences, the order of the sentences, etc. The environment 102 may achieve the above effect by locking individual items (or all items) in the OOD 112, preventing their modification by the worker entity.

But as noted above, in other cases, the environment 102 may alternatively permit the worker entity to make changes to the information itself. For example, in another case, the worker entity may make a translation-type change by converting the words in the original document from one natural language to another. In another case, the worker entity may make a proofreading-type change by modifying the grammar and/or spelling of words in the original document, and so on.

The environment 102 can record the changes made by the worker entity in different ways. In one case, the environment 102 preserves the OTD 118 as the only record of the changes made by the worker entity. In other cases, in addition to creating the OTD 118 itself, the environment 102 can preserve a record of each individual change made by the worker entity, or at least a subset of these changes. And each such change may be captured with any level of specificity. For example, if the worker entity changes the font of a particular word in the OOD 112, the environment 102 can record this change on a corresponding level of granularity. Collectively, the record of the changes made by the worker entity is referred to herein as change-history information.

Note that the above-type of changes are enumerated in the spirit of illustration, not limitation; a worker entity may make yet other types of changes that are not mentioned above. In all cases, the changes advance the development process towards the production of a final document.

In a next stage of the document creation flow, a de-obfuscation component 120 restores the sensitive items that have be obfuscated in the OTD 118, to produce a content-restored transformed document (CTD) 122 for consumption by the outsourcing entity (but not the worker entity). The de-obfuscation component 120 may perform this task in different ways, to be described below.

FIG. 1 depicts the above process changes in the context of a simplified example. In that example, the NOD 106 corresponds to a slide deck. At least one slide of the slide deck, depicted in high-level form in FIG. 1, has a plurality of bullet points. Assume that at least some of the information items in the bullet points contain sensitive items 108. FIG. 1 depicts those sensitive items 108, in their non-obfuscated forms, as solid-line boxes. The obfuscation component 110 obfuscates the sensitive items 108, e.g., by converting them into obfuscated items 114, to yield the OOD 112. FIG. 1 depicts the obfuscated items as dashed-line boxes.

The worker entity then organizes the bullet points in the OOD 112 into two columns, and then centers the bullet points within their respective columns, to yield the OTD 118. Such a change may be characterized as a formatting-type change, which does not affect any of the semantic content imparted by the NOD 106. The de-obfuscation component 120 then operates on the OTD 118 to transform the obfuscated items 114 to their original counterpart sensitive items 108, to yield the CTD 122. The CTD 122 preserves the formatting-type changes made by the worker entity.

Overall, the collaborative process integrates two realms of work, non-obfuscated and obfuscated. A dashed line 124 in FIG. 1 figuratively represents the boundary between these two realms. According to one benefit, the environment 102 provides a mechanism by which the outsourcing entity may freely interact with the worker entity in the course of a joint creation of a document, without divulging the sensitive information that is contained within the document to the worker entity.

The environment 102 may provide one or more communication mechanisms that allow the outsourcing entity to interact with the worker entity throughout the document-creation process. For example, the communication mechanisms can include text-based mechanisms (e.g., Instant Messaging mechanisms, Email mechanisms, etc.), voice communication mechanisms, video communication mechanisms, and so on. Through these mechanisms, the outsourcing entity can send instructions to the worker entity, and the worker entity can ask questions to the outsourcing entity. FIG. 1 shows a dashed line 126 which represents one or more communication channels between the outsourcing entity and the worker entity, provided by one or more communication mechanisms.

Further, in those cases in which the outsourcing entity and the worker entity engage in a text-based communication session, the messages exchanged between these entities can be considered documents in their own right. Hence, the obfuscation component 110 and the de-obfuscation component 120 can operate on these documents in the same manner described above. For example, assume that the outsourcing entity writes a message that reads, "I would like to see the sales figure "$1.4 million" in bold, and in larger font," without immediately realizing that he has crafted a message containing sensitive information. The obfuscation component 110 can remove the sensitive item in the message and replace it with an obfuscated item, e.g., by replacing "$1.4 million" with "$## AMOUNT," etc. In the message thread that is returned to the outsourcing entity from the worker entity, the de-obfuscation component 120 can replace the obfuscated item with its original sensitive item, namely, "1.4 million." In addition, the communication channels can optionally be encrypted to prevent other entities, not party to the interaction between the outsourcing entity and the worker entity, from accessing the message exchange.

In some cases, the outsourcing entity may be satisfied with the transformed document (e.g., the OTD 118) that is produced by the worker entity. The outsourcing entity's receipt of the CTD 122 therefore would present the end of the document creation process, and the production of the final document. In other cases, the outsourcing entity may perform further operations on the CTD 122 to yield the final document. In other cases, the outsourcing entity may instruct the worker entity to make additional changes to the existing OTD 118 that the worker entity already has in his or her possession. Or the outsourcing entity may generate a new OOD, and ask the worker entity to make changes on that new OOD.

As another variation, the document creation process was described above as commencing with the production or receipt of a non-obfuscated original document (NOD) 106, containing sensitive items 108 and no obfuscated items. But the original document could alternatively contain at least some obfuscated items in its original state, e.g., as produced by some other preliminary process, not shown in FIG. 1. In this sense, the term non-obfuscated document (NOD) is a relative term which indicates that the starting document contains at least some sensitive items that have yet to be obfuscated.

As another possible variation, the environment 102 was described above in the context of the use of a single worker entity. In other cases, the collaborative document creation process may represent a team effort. That is, one or more outsourcing entities may prepare the NOD 106, and one or more worker entities may transform the counterpart OOD 112 into the OTD 118. For example, the outsourcing entity(ies) can break the NOD 106 into plural parts. The obfuscation component 110 can obfuscate the plural parts, to yield plural obfuscated parts. Different worker entities can operate on the obfuscated parts to yield plural obfuscated transformed parts. The de-obfuscation component 120 can restore the sensitive items in the obfuscated transformed parts, to yield plural content-restored transformed parts. The outsourcing entity(ies) can then assemble the plural content-restored transformed parts into a single content-restored transformed document. In one particular implementation, an outsourcing entity may use a crowdsourcing platform to interact with the above-described plural worker entities. Further, in some cases, different worker entities may be authorized to consume different parts of the NOD 106, but not other parts. In that scenario, the obfuscation component 110 can obfuscate the NOD 106 in different ways for consumption by different respective worker entities.

As another possible variation, at least a portion of the NOD 106 may contain audio information. The obfuscation component 104 can obfuscate sensitive utterances (or sounds) in the NOD 106 by replacing these sensitive audio items with obfuscated audio items, e.g., bleeps, blank pauses, dummy word utterances, etc. The de-obfuscation component 120 can perform the opposite conversion. In between obfuscation and de-obfuscation, a worker entity may modify any aspect of the NOD 106, such as its volume, sound quality, etc. But to simplify the remainder of the explanation, it will henceforth be assumed that obfuscation and de-obfuscation take place in the visual realm.

As another variation, the outsourcing entity and the worker entity may represent peers who are engaged in the joint creation of a document. More precisely stated, these two individuals may represent two workers, neither under direction of the other. Further, the outsourcing entity may be privy to certain sensitive information for which the worker entity is not authorized to receive (as in the above examples); in addition, the worker entity may be privy to other sensitive information for which the outsourcing entity is not authorized to receive. In that case, the obfuscation component 110 can selectively obfuscate certain sensitive information that is flowing from the outsourcing entity to the worker entity, and selectively obfuscate other information that is flowing from the worker entity to the outsourcing entity. In a counterpart operation, the de-obfuscation component 120 can selectively de-obfuscate certain sensitive information that is flowing from the worker entity to the outsourcing entity, and selectively de-obfuscate other information that is flowing from the outsourcing entity to the worker entity.

To be more concrete, assume that two lawyers are working on a sales contract for the purchase of a chemical compound, e.g., on behalf of a third party entity. Assume that the first lawyer can consume sales data in the contract, but not technical data, while the second lawyer can consume technical data in the contract, but not sales data. The obfuscation component 110 would prevent the second lawyer from receiving sales data and the first lawyer from receiving technical data. The third party entity, on the other hand, may be authorized to consume the entire document.

The environment 102 can achieve the above behavior in different ways, such as by encrypting different parts of a document with different respective encryption keys, and distributing counterpart decryption keys to different worker entities. Alternatively, or in addition, the environment 102 can achieve the above behavior by using access control list (ACL) functionality, etc.

Advancing now to FIG. 2, this figure show an instance of at least one document creation tool 202 (referred to in the singular below), and an instance of an outsourcing tool 204. The environment 102 of FIG. 1 performs its function using one or more instances of these tools, as will be described below with respect to the examples of FIGS. 3 and 4.

In one implementation, the document creation tool 202 and the outsourcing tool 204 represent two computer-implemented applications. In that context, the document creation tool 202 may contain an interface mechanism 206 for activating the outsourcing tool 204 in the course of its execution, and/or the outsourcing tool 204 may contain an interface mechanism (not shown) for activating the document creation tool 202 in the course of its execution. In another example, the document creation tool 202 and the outsourcing tool 204 are integrated together into a single application. For example, the outsourcing tool 204 may represent a module associated with the code provided by the document creation tool 202. The environment 102 may provide yet other ways for implementing the functions of the document creation tool 202 and the outsourcing tool 204.

The document creation tool 202 can include any document manipulation mechanisms 208 for loading documents, creating and editing documents, presenting documents, and so on. The document manipulation mechanisms 208 will vary depending on the type of document under consideration. For example, the mechanisms 208 represent functionality for creating and presenting any of a word processing document, a slide deck, a graphics-bearing document, an image, a video, etc. In another case, the mechanisms 206 represent functionality for creating a document that is intended for presentation as a web page, and so on.

The outsourcing tool 204 itself may include any number of modules that perform different respective functions, which may be provided at a single site or distributed over plural sites. An obfuscation component 210 transforms a non-obfuscated original document (NOD) into an obfuscated original document (OOD). In other words, the obfuscation component 210 represents an instantiation of the obfuscation component 110 introduced in FIG. 1. A de-obfuscation component 212 transforms an obfuscated transformed document (OTD) into a content-restored transformed document (CTD). In other words, the de-obfuscation component 212 represents an instantiation of the de-obfuscation component 120 of FIG. 1. A communication component 214 implements one or more communication mechanisms that allow the outsourcing entity to communicate with the worker entity. Or the communication component 214 may represent a portal to one or more separately-implemented communication mechanisms.

The outsourcing tool 204 can also include one or more other components 216, such as a module for selecting a worker entity from among a group of available worker entities, a module for ranking the work performed by a selected worker entity, and so on.

Figure 3:
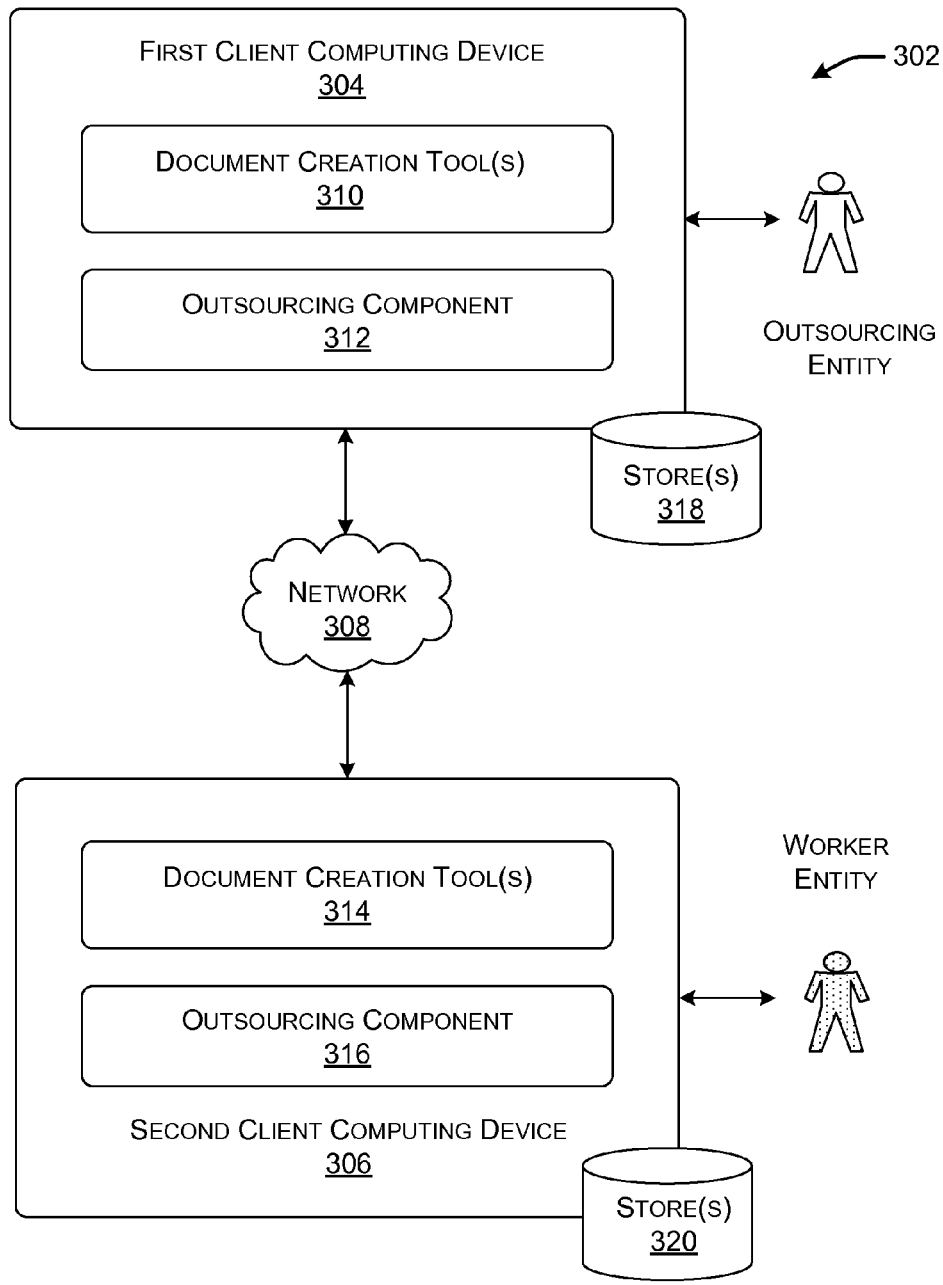
FIG. 3 shows one implementation of the environment of FIG. 1.

FIG. 3 shows a system 302 which represents one implementation of the environment 102 of FIG. 1. The system 302 is depicted with respect to the interaction between one outsourcing entity and one worker entity, although, as described above, the environment 102 can be used by plural outsourcing entities and/or plural worker entities, for any given document transformation task.

The system 302 includes a first client computing device 304 and a second client computing device 306, coupled together via a network 308. The outsourcing entity interacts with the first client computing device 304, while the worker entity interacts with the second client computing device 306. The client computing devices (304, 306) may represent any type(s) of user computing devices, e.g., selected from among: stationary personal computing devices or work stations, laptop computing devices, tablet-type computing devices, game console devices, set-top box devices, smartphones, etc.

The network 308 may correspond to a wide area network (e.g., the Internet), a local area network, point-to-point links, etc., or any combination thereof. Alternatively, the outsourcing entity and the worker entity may exchange documents via other communication strategies, e.g., via portable storage devices (e.g., thumb drives, etc.).

The first client computing device 304 may host one or more document creation tools 310 (referred to in the singular below) and an outsourcing tool 312. Similarly, the second client computing device 306 can host one or more document creation tools 314 (referred to in the singular below) and an outsourcing tool 316. The document creation tools (310, 314) can include any of the document creation applications described above with respect to FIG. 2. Similarly, the outsourcing tools (312, 316) can include any of the modules described above with respect to FIG. 2.

The first client computing device 304 may include one or more data stores 318 for storing documents that it creates or receives. Similarly, the second client computing device 306 may include one or more data stores 320 for storing documents that it creates or receives. The data stores (318, 320) may be local or remote with respect to their respective client computing devices (304, 306).

In one allocation of functions, the outsourcing tool 312 of the first client computing device 304 is responsible for both obfuscating the NOD 106, to produce the OOD 112, and for de-obfuscating the OTD 118, to produce the CTD 122. In that implementation, the outsourcing tool 316 of the worker's client computing device 306 may omit its own local instantiation of an obfuscating component and a de-obfuscating component. Or the worker's outsourcing tool 316 may include an obfuscating component and a de-obfuscating component, yet these components are not invoked in the above-described scenario.

For example, the description will set forth an implementation below, with respect to FIG. 11, in which all client computing devices are equipped with the ability to de-obfuscate documents. But that ability is contingent on the de-obfuscation component possessing a decryption key which allows it to access the sensitive information in a document. In the context of FIG. 3, the worker's client computing device 306 would lack such a key, making it unable to access or produce the NOD 106 or the CTD 122. In another implementation, the environment 102 can use access control list (ACL) technology to manage the selective consumption of different kinds of documents and document parts.

The first client computing device 304 can send the OOD 112 to the second client computing device 306 via the network 308 in any form, e.g., as an attachment to an Email message, etc. Similarly, the second client computing device 306 can send the OTD 118 to the first client computing device 304 via the network 308 in any form.

Figure 4:
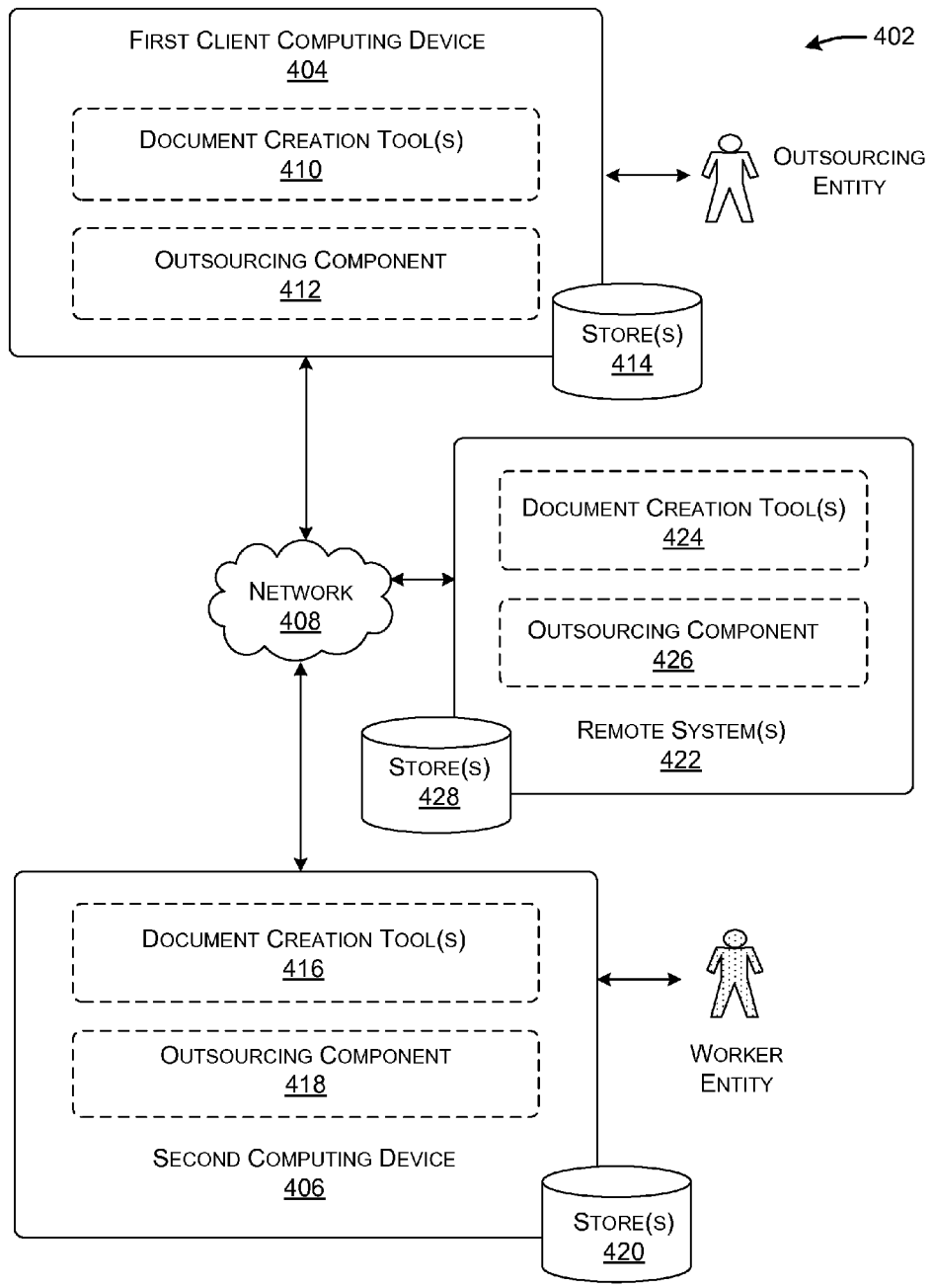
FIG. 4 shows another implementation of the environment of FIG. 1.

FIG. 4 shows another system 402, which represents another implementation of the environment 102 of FIG. 1. The system 402 includes a first client computing device 404, with which the outsourcing entity interacts, and a second client computing device 406, with which the worker entity interacts. A network 408 couples the first client computing device 404 with the second client computing device 406. The client computing devices (404, 406) and the network 408 may be implemented using the same computing equipment described above for FIG. 3, with respect to the counterpart same-named components.

The first client computing device 404 may host one or more document creation tools 410 (referred to in the singular below) and an outsourcing tool 412, and may store its documents in one or more local and/or remote data stores 414. Similarly, the second client computing device 406 may host one or more document creation tools 416 (referred to in the singular below) and an outsourcing tool 418, and may store its documents in one or more local and/or remote data stores 420.

Again, these components may include the same functionality described above with respect to FIG. 3.

Unlike FIG. 3, the system 402 of FIG. 4 also includes one or more remote computing systems 422, referred to in the singular below as simply a remote system. The remote system 422 may be implemented by one or more server computing devices and/or other computing equipment. The remote system 422 hosts one or more document creation tools (referred to in the singular below) 424 and an outsourcing tool 426, and it stores it documents in one or more data stores 428.

In one allocation of functions, the remote outsourcing tool 426 hosted by the remote system 422 performs all obfuscation and de-obfuscation functions in the system 402. For example, the first client computing device 404 may transfer the NOD 106 to the remote obfuscation component, which then produces the OOD 112 and transfers it to the second client computing device 406. Similarly, the second client computing device 406 transfers the OTD 118 to the remote de-obfuscation component hosted by the remote system 422, whereupon the de-obfuscation component converts it to the CTD 122 and transfers it to the first client computing device 404. To serve this role, the remote system 422 may function as a service that is trusted by the outsourcing entity to maintain the confidentiality of any non-obfuscated content that it receives or produces.

In the above scenario, the first client computing device 404 can perform document creation tasks using its local document creation tool 410 in the same manner described above. Similarly, the second client computing device 406 can perform document creation tasks using its own local document creation tool 416.

In yet another implementation, the system 402 allocates all document creation tasks to the remote document creation tool 424. For example, the document creation tool 424 may represent a web-implemented word processing application. The first client computing device 404 and the second client computing device 406 may operate on separation instantiations of the service provided by the remote document creation tool 424. In this situation, the documents produced by the outsourcing entity and the worker entity may be operated on and maintained by the remote system 422; hence, the client computing devices (404, 406) need not perform local manipulations on the documents, and need not transfer the documents between themselves via messages in the manner described above.

In another case, the document creation functionality that is available to the first client computing device 404 is distributed between the local client computing device 404 and the remote system 422 in any manner. Similarly, the document creation functionality that is available to the second client computing device 406 is distributed between the local client computing device 406 and the remote system 422 in any manner.

In yet another implementation, the remote document creation tool 424 represents collaborative document creation functionality which allows the outsourcing entity and the worker entity to work on the same document being created at the same time, e.g., within a shared workspace, as opposed to separate non-shared workspaces as in the examples provided above. But, at any given time, the remote outsourcing component 426 gives the outsourcing entity and the worker entity two different views of the document that is being operated on at a current time. That is, the outsourcing component 426 gives the outsourcing entity a non-obfuscated version of the document, while giving the worker entity an obfuscated version of the document.

Further, in the above collaborative scenario, the remote obfuscation component provided by remote system 422 can automatically convert any new incremental change made by the outsourcing entity to an appropriately obfuscated view of the document for presentation to the worker entity. Similarly, the remote de-obfuscation component provided by the remote system 422 can automatically apply any new incremental change made by the worker entity to an appropriated non-obfuscated view of the document for presentation to the outsourcing entity. In other words, in the above implementation, the basic flow introduced in the context of FIG. 1 may take place in piecemeal fashion for each incremental change made to a document by either the outsourcing entity or the worker entity. Further, the outsourcing entity and the worker entity may be making some changes in parallel with each other, in addition to making changes in series.

The implementations of FIGS. 3 and 4 are to be understood in the spirit of illustration, not limitation; that is, other implementations of the environment 102 of FIG. 1 are possible.

FIGS. 5-8 show illustrative user interface presentations that may be provided by the environment 102 of FIG. 1. That is, the functionality of the environment 102 may produce the user interface presentations at different respective stages in the development of a final document. To facilitate description, it will be assumed that the process flow takes place in substantially sequential fashion, e.g., where the outsourcing entity produces the NOD 106, followed by the worker entity producing the OTD 118. But as noted above, in other cases, both the outsourcing entity and the worker entity may be working on the same document at generally the same time, making changes in incremental fashion.

The visual and functional aspects of the user interface presentations are set forth below in the spirit of illustration, not limitation. Other implementations can vary any aspect of the user interface presentations, including, but are not limited to, the selection of GUI features, the arrangement of those features, the functionality associated with those features, etc. To cite merely one example, in FIGS. 5-8, the document creation tool and the outsourcing tool contribute to a single integrated user interface presentation having two or more sections devoted to different functions. But in other examples, the document creation tool and the outsourcing tool can present separate respective user interface presentations.

Figure 5:
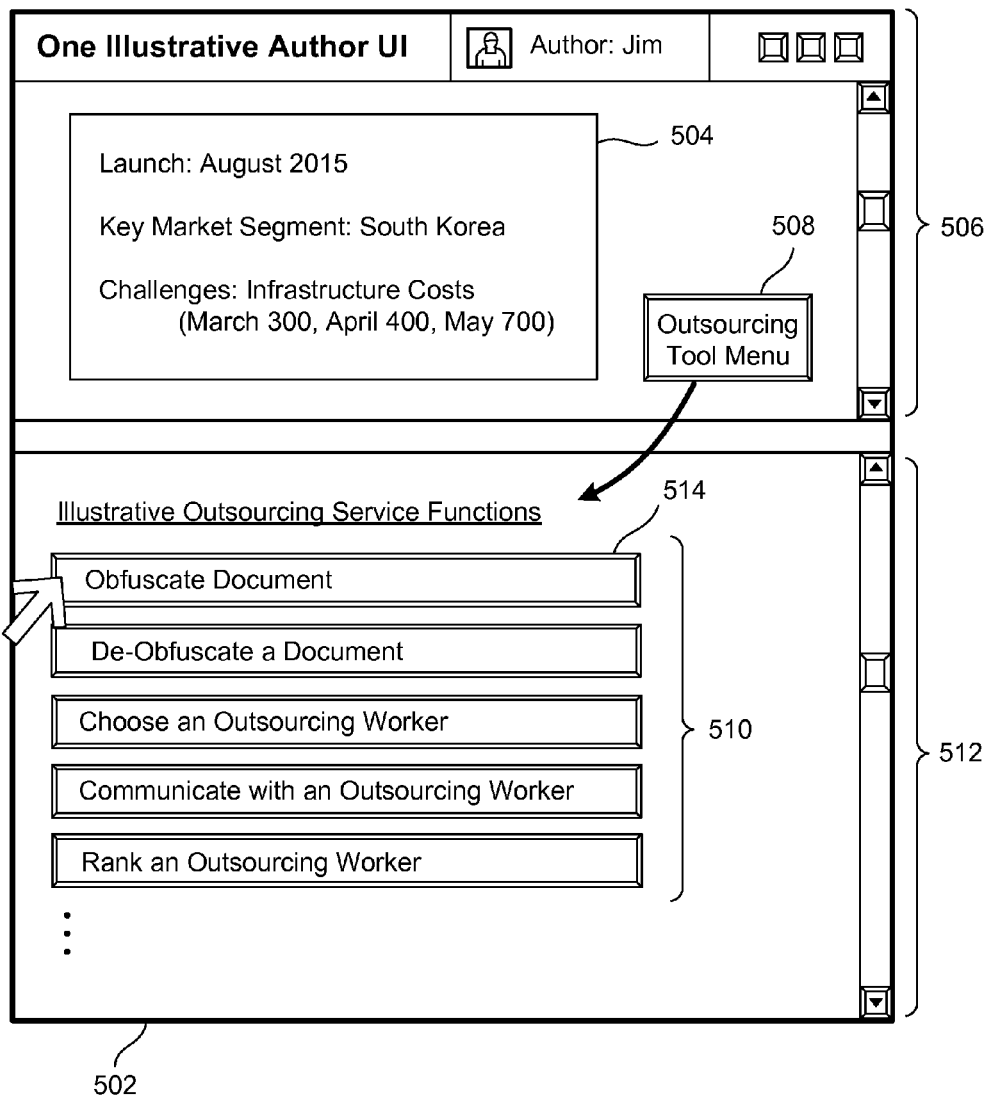
FIGS. 5-8 show various user interface presentations that may be provided by the environment of FIG. 1.

Starting with FIG. 5, this figure shows a user interface presentation 502 with which an outsourcing entity may interact upon initially invoking an outsourcing tool. The outsourcing tool may correspond to code that is resident on the outsourcing entity's client computing device and/or a remote system.

More specifically, assume that the user first interacts with a document creation tool to produce or otherwise provide a slide deck having a single page 504. The document creation tool presents that page 504 within a section 506 of the user interface presentation 502. The page 504 includes a plurality of bullet points that express information regarding a particular topic. In the terminology of FIG. 1, the page 504 constitutes a non-obfuscated original document (NOD) 106, and the information expressed on the page 504 may be conceptualized as being composed of a plurality of content items.

Assume that the outsourcing entity considers at least some of the content items in the page 504 as sensitive information that should not be disclosed to the worker entity, for any application-specific reason(s). For example, the outsourcing entity may consider all of the alphanumeric text in the page 504 as confidential. Alternatively, as in the example that is actually depicted in FIG. 5, the outsourcing entity may consider just the specified launch date ("August 2015"), the key market segment ("South Korea"), and the infrastructure cost data ("300," "400," and "700") to be sensitive items in the page 504. The outsourcing entity's interpretation of the page 504 that is set forth above is merely illustrative.

The document creation tool may present a control of any type in the first section 506, such as the control button 508. The outsourcing entity may click the button 508 to invoke the outsourcing tool. In response to the activation of the button 508, the outsourcing tool presents a menu of options 510 to the outsourcing entity in a second section 512 of the user interface presentation 502. A first option 514 allows the outsourcing entity to obfuscate a document. A second option allows the outsourcing entity to de-obfuscate a document (assuming that the document is not automatically de-obfuscated for the outsourcing entity upon its receipt from the worker entity). A third option allows the outsourcing entity to choose a worker entity or worker entities from a pool of available worker entities. A fourth option allows the outsourcing entity to evaluate the work that has already been performed by a worker entity, and so on. Still further options may be available, such as an option that allows an outsourcing entity to manage an account, pay for services, and so on.

Figure 6:
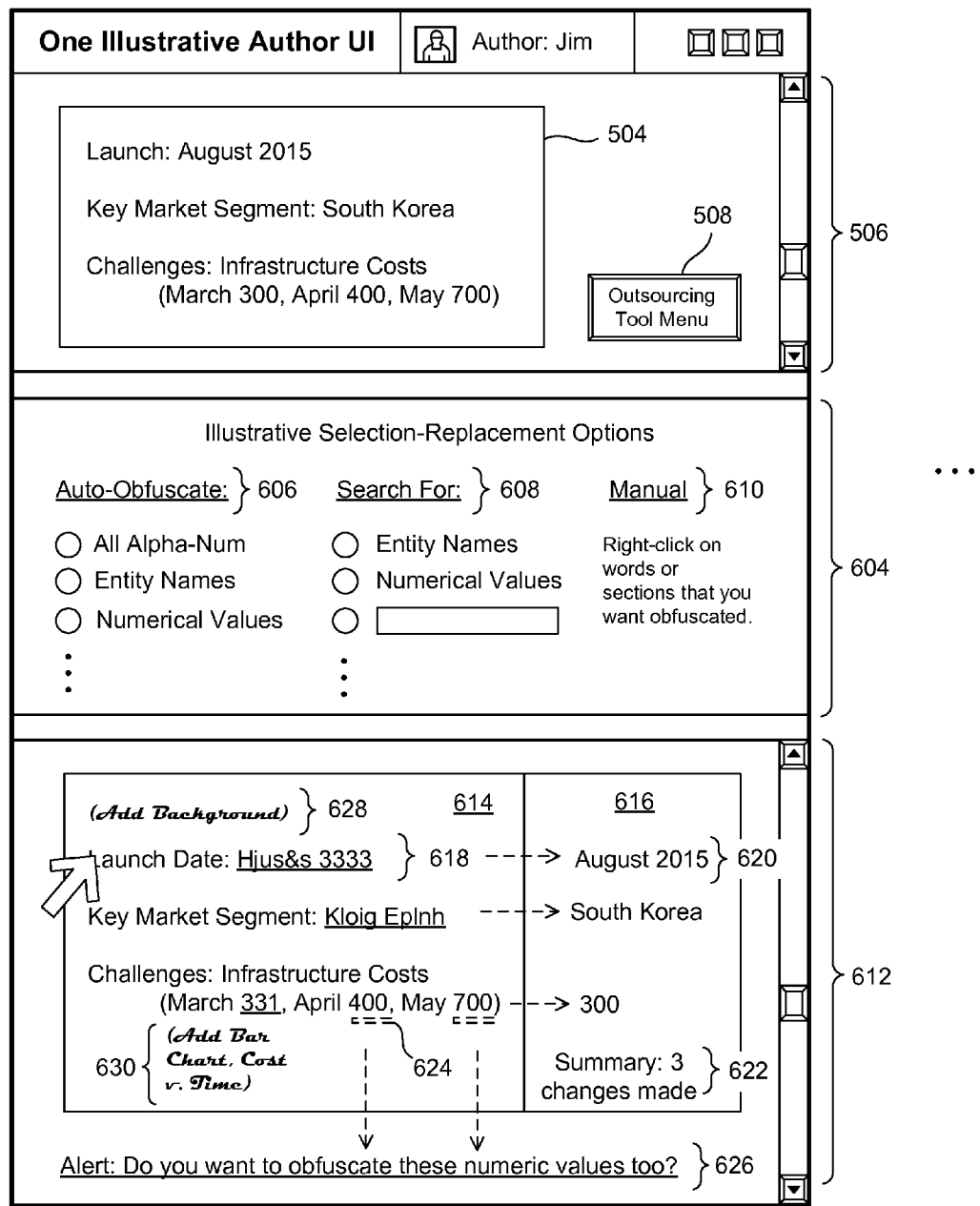

Advancing to FIG. 6, this figure shows a user interface presentation 602 that may be presented to the outsourcing entity upon the outsourcing entity's selection of an obfuscation menu option 514 in the menu of options 510 of FIG. 5. In that user interface presentation 602, the document creation tool may optionally continue to present the page 504 of the slide deck within a first section 506 of the user interface presentation 602. In addition, the outsourcing tool may now present various GUI features that allow the user to obfuscate the sensitive items in the page 504. As stated above, in the terminology of FIG. 1, the page 504 in its original form constitutes the non-obfuscated original document (NOD) 106.

For example, in section 604, the outsourcing tool may provide various options that allow the user to find and replace sensitive items in the NOD 106 using different respective mechanisms. For instance, a first subsection 606 allows a user to designate the type of content items that should be obfuscated, such as all alphanumeric content, all entity names, all numeric values, etc., or any combination thereof. The outsourcing tool can use one or more strategies to find the selected content items, depending on the type(s) of content items selected by the user. For example, assume that the user specifies that all entity names are to be obfuscated. The outsourcing tool can use any entity detection technique to find entity names in a document, such as by comparing the terms in the document against a dictionary that identifies known entity names, or by analyzing the terms in a document using a machine-trained entity-detection model or a rules-based entity-detection model, and so forth.

A second subsection 608 allows the outsourcing entity to instruct the outsourcing tool to search for designated sensitive items. Upon finding a sensitive item, the outsourcing tool may highlight its presence, and then give the outsourcing entity the ability to manually or automatically obfuscate the sensitive item. A third subsection 610 invites the outsourcing entity to manually search through the NOD 106 to identify sensitive items. The outsourcing tool may then give the outsourcing entity the option to manually or automatically convert each identified sensitive item to an obfuscated counterpart. Still further seek-and-replace strategies are possible.

Although not shown, the section 604 may also give the outsourcing entity the option of choosing the parts of the NOD 106 that are to be obfuscated, assuming that is, that some parts are to be obfuscated and some parts do not need to be obfuscated. Again, the section 604 can provide a variety of tools for accomplishing this task. In one case, the section 604 can allow the outsourcing entity to manually select the parts (e.g., sections or pages) that are to be obfuscated. Alternatively, or in addition, the section 604 can allow the outsourcing entity to specify section-selection criteria; the obfuscation component 110 then finds sections that match the criteria and obfuscates them. For example, in a contract with confidential names and monetary figures, the outsourcing entity can broadly specify that any section of the document that contains at least one occurrence of these data items is to be obfuscated in its entirety.

Further, although not shown, the section 604 may also give the user the option of choosing the manner in which obfuscation is performed, that is, in those cases in which the outsourcing tool automatically performs obfuscations (rather than relying on the outsourcing entity to manually perform obfuscation). For example, in a first option, the outsourcing tool can replace sensitive items with random strings having the same length as the respective sensitive items being replaced. In a second option, the outsourcing tool can modify its random obfuscation by placing various constraints on the manner in which it performs obfuscations, such as by replacing alphabetical characters with randomly selected alphabetical characters, by replacing numeric characters with randomly selected numeric characters, by replacing upper-case and lower-case characters with characters that have, respectively, the same case status, and so on. In a third option, the outsourcing tool can replace sensitive items with dummy "real" words of like kind, e.g., by replacing an actual name with the dummy name "John Doe," or by replacing an actual year with the dummy year "3000," etc. In one technique, the outsourcing tool can perform the above-described function by using a hash table or mapping algorithm which maps the characters of a sensitive item into an entry within a collection of obfuscated items; that entry represents an actual word, but a word that nonetheless does not reveal any sensitive information.

Assume that the outsourcing entity opts to manually review the page 504 to identify the sensitive items in the page 504. In response, the outsourcing tool may present a section 612 of the user interface presentation 602. As indicated there, the user has manually identified the launch date ("August 2015"), the key market segment ("South Korea"), and one of the infrastructure cost data items ("300") as sensitive items. In response to those selections, the outsourcing tool can use any obfuscation strategy described above to automatically replace the sensitive items with obfuscated items, e.g., by replacing the sensitive item "August 2015" with the meaningless and randomly-chosen text "Hjus&s 3333." Or the outsourcing tool can allow the outsourcing entity to manually obfuscate these sensitive items.

The outsourcing tool may also apply various strategies that allow the outsourcing entity to verify that all sensitive items that he or she intends to obfuscate have, in fact, been obfuscated. For example, the section 612 may present a subsection 614 that highlights all of the content items that have been changed in the obfuscation process. The outsourcing entity may verify that all appropriate content items have been replaced by examining the highlighting in the subsection 614, and/or by comparing the subsection 614 to the original page 504 which appears in the first section 506.

In some implementations, the outsourcing tool may also use a second subsection 616 to provide additional information regarding changes that have been made in the obfuscation process. For example, the second subsection 616 may list all of the original content items that have been removed from the NOD 106 to produce the OOD 112. For instance, the second subsection 616 reveals that an obfuscated item 618 has replaced an original sensitive item 620. The second subsection 616 may also provide higher-level metadata which summarizes the replacements that have been made. For instance, a summary message 622 indicates that three changes have been made to the NOD 106 to produce the OOD 112.

Alternatively, or in addition, the outsourcing tool can automatically detect the type of changes that the outsourcing entity has made, and then automatically determine whether there are existing content items of the same type that have not yet been replaced. For example, assume that the outsourcing entity manually removes all but one of the entity names within the NOD 106. The outsourcing tool can respond to these actions by detecting that the content items that have been replaced likely pertain to entity names, e.g., by using any entity detection algorithm described above. The outsourcing tool can then determine whether there are any additional entity names that remain in the NOD 106 that have not yet been replaced. If yet-to-be replaced sensitive items remain, the outsourcing tool can alert the user to this fact; the outsourcing tool can also give the user the opportunity to obfuscate the remaining sensitive item(s).

In the specific example of FIG. 6, the outsourcing tool has detected that the outsourcing entity has replaced a first numeric value in a set of three infrastructure cost values, but not the second value and the third value. In response, the outsourcing tool can highlight the remaining numeric values, e.g., as shown by the illustrative highlighting 624. Further, the outsourcing tool can display a message 626 which invites the user to modify the second and third numeric values. Still other strategies can be used to identify yet-to-be obfuscated sensitive items.

In certain cases, the outsourcing entity may also wish to convey specific instructions to the worker entity. The outsourcing entity may perform this task in any manner, such as by directly communicating with the worker entity using any communication mechanism. In the case of FIG. 6, the outsourcing entity has also embedded metadata into the OOD 112 which operates as instructions to the worker entity. For example, a first instruction 628 may ask the worker entity to add a background image to the OOD 112. A second instruction 630 may ask the worker entity to produce a bar chart which presents the infrastructure cost values. In other cases, as mentioned above, the outsourcing entity may give the worker entity greater latitude in making changes, e.g., by giving the worker entity the option of illustrating the numerical values using the type of chart that the worker entity deems the most effective.

Figure 7:
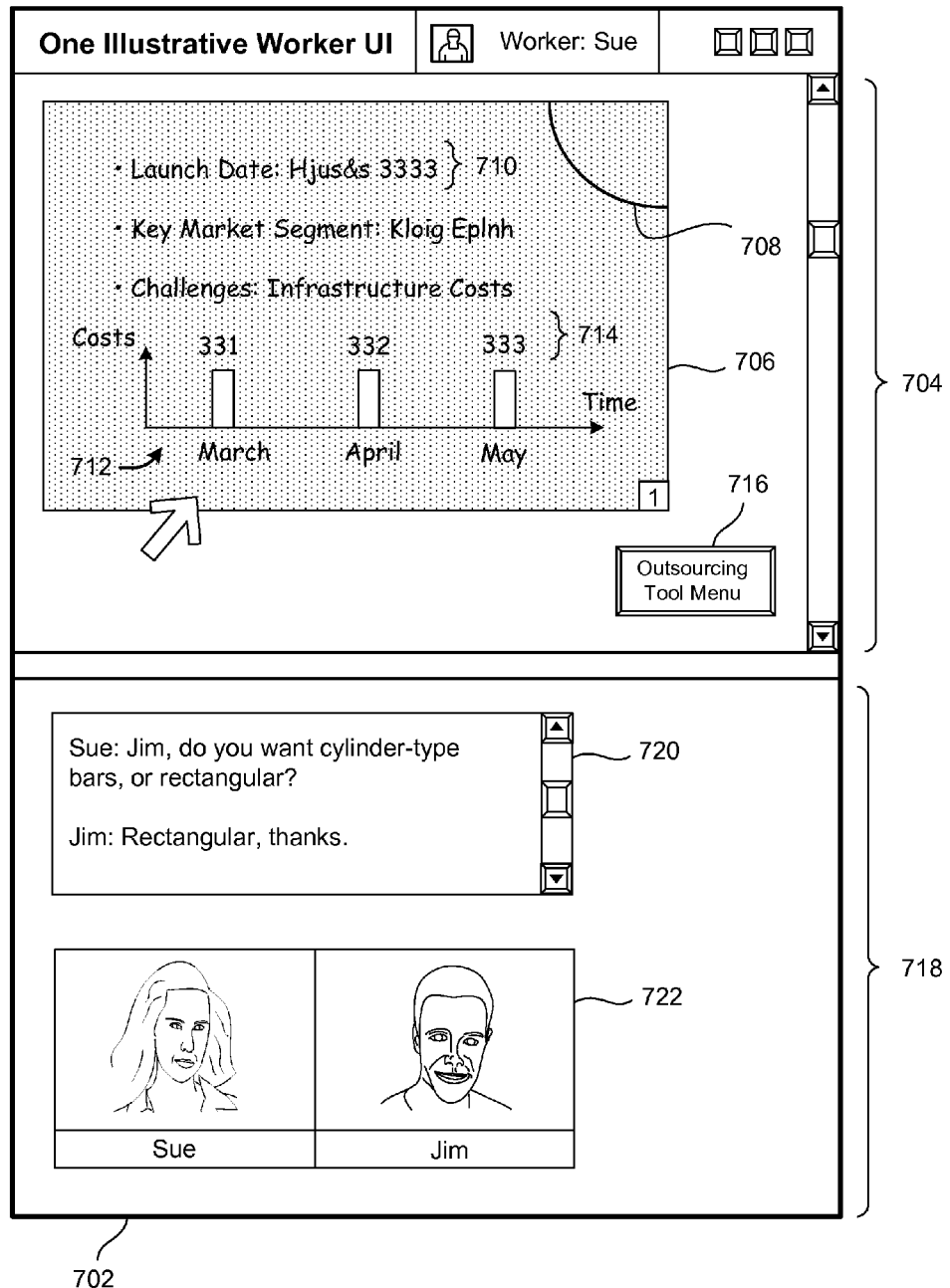

FIG. 7 shows a user interface presentation 702 that the environment 102 may present to the worker entity, for use by the worker entity in transforming the OOD 112 to the OTD 118. More specifically, a document creation tool that is available to the worker entity may present a first section 704 of the user interface presentation 702. The worker entity may make any changes via this section 704, to yield a page 706 of the OTD 118, corresponding to the counterpart page 504 of the NOD 106. The document creation tool with which the worker entity interacts may be hosted by a local client computing device and/or a remote system.

For instance, in the merely representative case of FIG. 7, the worker entity has: (a) changed the font of the alphanumeric text in the OOD 112; (b) added bullet points symbols to the beginning of the respective bullet points in the OOD 112; (c) added a background image to the OOD 112; (d) added a supplemental image 708 to the OOD 112; (e) formatted the data items into a bar chart, and so on. Although not shown, the environment 102 can optionally continue to also show the original (unmodified) OOD 112, e.g., in another section of the user interface presentation 702.

In the course of making all of the above changes, the worker entity is not exposed to the real content of the sensitive information that appears in the NOD 106. For example, the worker entity can format the first bullet point 710 without gaining knowledge of the specific date to which it refers. In other cases, the outsourcing entity may choose to obfuscate all alphanumeric content in the NOD 106, upon which the worker entity will have even less information regarding each bullet point.

With particular regard to the bar chart shown in the page 706, recall that outsourcing entity has replaced the actual numeric values with dummy values. Further, the outsourcing entity has instructed the worker entity to produce a bar chart that conveys infrastructure costs versus time. The worker entity responds by building a chart 712 based on those dummy cost values 714, not the real values. In another case, not illustrated, the outsourcing entity can retain the actual values in the OOD 112, but obfuscate the meaning of those actual values. For example, the outsourcing entity can identify that the bar chart is to be defined by a first variable (for presentation on a vertical axis) and a second value (for presentation on a horizontal axis), but without stating that the first and second variables correspond to cost and time, respectively. Still other strategies can be employed to obfuscate the raw data to be used in the construction of a chart or graph.

The worker entity may invoke the services of an instantiation of the outsourcing tool by clicking on a command button 716 or the like. In response, the outsourcing tool may present the type of menu of options 510 shown in FIG. 5. Assume that worker entity wishes to communicate with the outsourcing entity in the course of producing the OTD 118. The worker entity may click on an appropriate communication-related entry in the menu of options 510. In response, the outsourcing tool may present section 718 of the user interface presentation 702.

Section 718 may represent one or more interfaces to the worker entity by which the worker entity may communicate with the outsourcing entity. For example, the section 718 can include a subsection 720 that allows the worker entity to frame a question in textual form, and/or a subsection 722 that allows the worker entity to directly converse with the outsourcing entity using a video communication mechanism, and so on.

Figure 8:
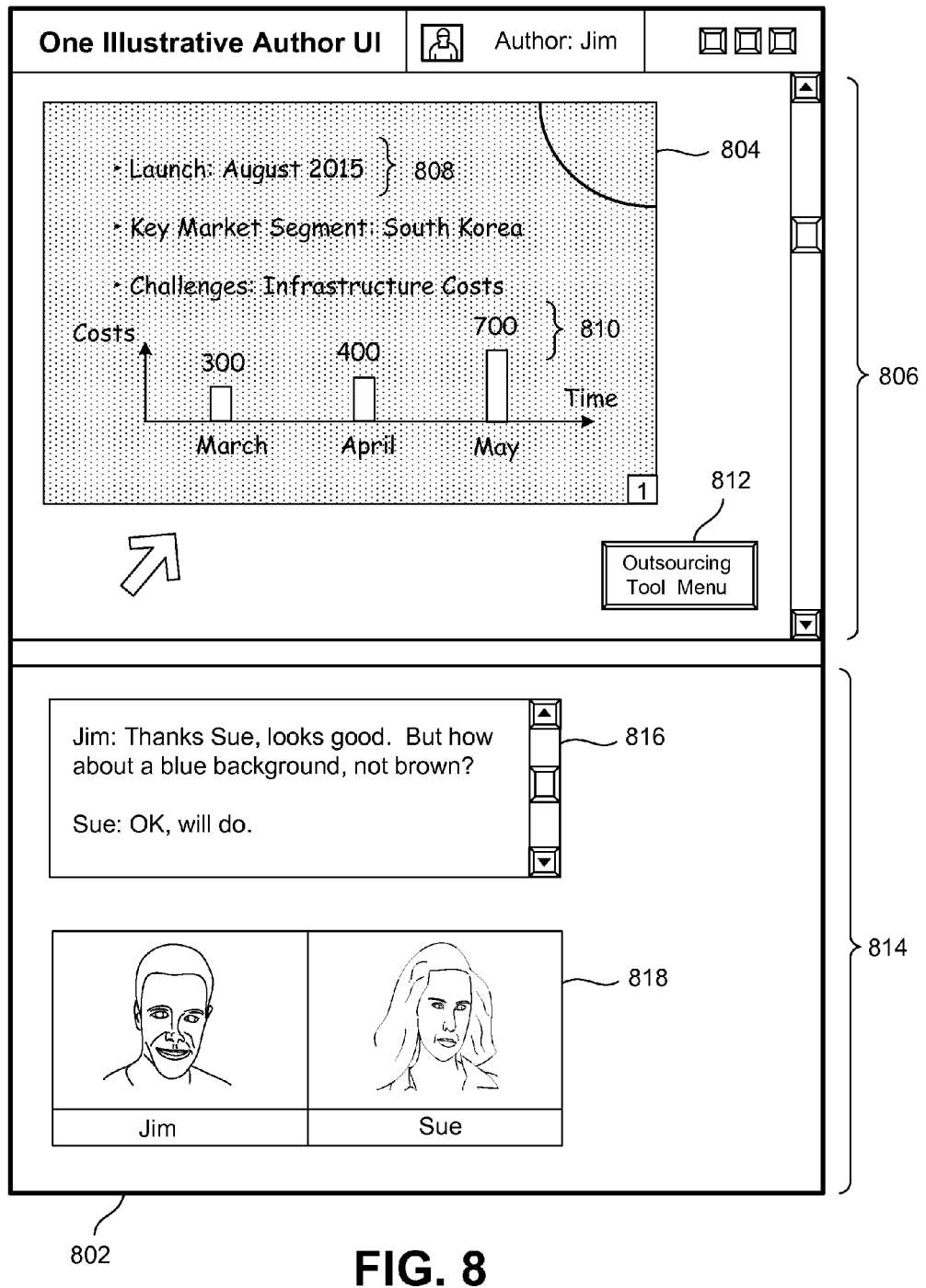

FIG. 8 shows a user interface presentation 802 which is presented to the outsourcing entity, for display of the CTD 122. The CTD 122 is the content-restored version of the OTD 118 generated by the worker entity using the user interface presentation 702 of FIG. 7.

More specifically, a document creation tool that is available to the outsourcing entity may present a page 804 of the OTD 118 in a first section 806 of the user interface presentation 802. The page 804 may have the same content and appearance as the page 706 of the OTD 118, except that the de-obfuscation component has now restored the obfuscated items to their corresponding original sensitive items. For example, the page 804 may contain the actual launch date ("August 2015") 808 in the first bullet point, rather than the obfuscated item ("Hjus&s 3333") in the page 706. And the bar chart is modified to include the actual numeric cost values 810, rather than the dummy cost values 714.

Again, the outsourcing entity may invoke the services of the outsourcing tool by activating a command button 812 or the like. In response, the outsourcing tool can again present the menu of options 510 shown in FIG. 5. Assume that the outsourcing entity wishes to send further instructions to the worker entity. The outsourcing entity may then activate a communication-related option in the menu of options 510, upon which the outsourcing tool presents a second section 814 of the user interface presentation 802.

The second section 814 provides various interfaces (816, 818) that allow the outsourcing entity to communicate with the worker entity using different respective communication mechanisms, e.g., a text-based communication mechanism, a video communication mechanism, and so on. In response to the outsourcing entity's further instructions, the worker entity may make further changes to the OTD 118; the outsourcing entity will receive those changes as an updated version of the CTD 122. The above collaborative process can be repeated in the above manner any number of times until a final document is produced to the satisfaction of the outsourcing entity.

Figure 2:
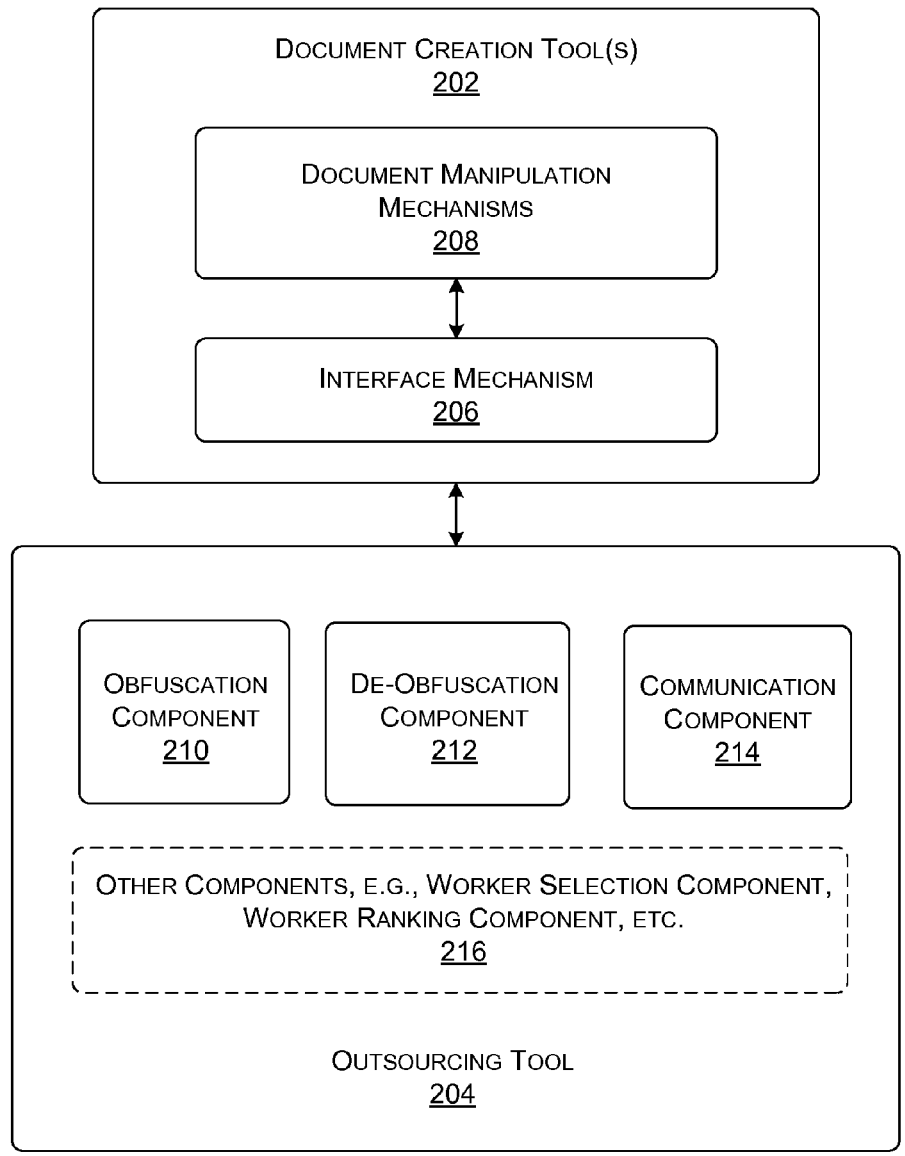
FIG. 2 shows an instance of a document creation tool and an instance of an outsourcing tool, for use in the environment of FIG. 1.
Figure 9:
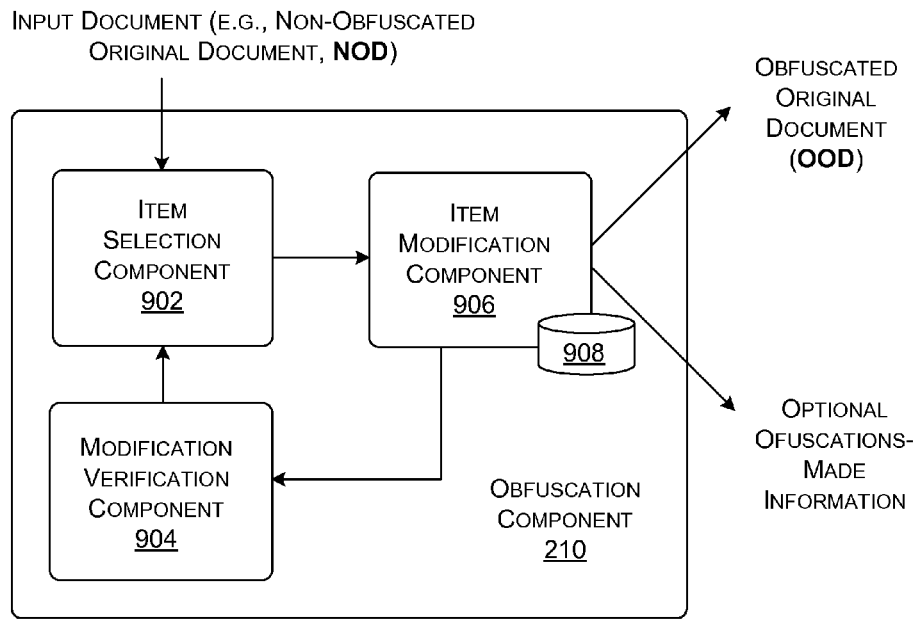
FIG. 9 shows one implementation of an obfuscation component, which is component of the outsourcing tool of FIG. 2.

FIG. 9 shows one implementation of the obfuscation component 210, which is a component of the outsourcing tool 204 of FIG. 2, and which can be implemented locally and/or remotely with respect to the outsourcing entity's client computing device. The obfuscation component 210 includes an item selection component 902 which provides one or more mechanisms for selecting sensitive items to be replaced by obfuscated items. In one case, the item selection component 902 may provide the section 604 (of FIG. 6) through which the outsourcing entity may interact with the item selection component 902. In one approach, the item selection component 902 receives matching criteria from the outsourcing entity and then automatically finds content items in the NOD 106 which match those criteria. In a second approach, the item selection component 902 provides functionality by which the outsourcing entity may manually review the NOD 106 and select content items of interest, and so on.

A modification verification component 904 presents one or more mechanisms through which the outsourcing entity can verify that all content items that were intended to be obfuscated have, in fact, been obfuscated. In one example, the modification verification component 904 can interact with the outsourcing entity via the section 612 of FIG. 6. In one verification strategy, the modification verification component 904 can highlight changes that have been made to the NOD 106 within the section 612. In another strategy, the modification verification component 904 can automatically detect the type of changes that the outsourcing entity has already made, and alert the outsourcing entity to content items of the same type that have not yet been obfuscated, and so on.

An item modification component 906 performs the actual replacement of sensitive items with counterpart obfuscated items. The item modification component 906 can use different strategies to perform this task. In one approach, the item modification component 906 can replace each sensitive item with randomly chosen characters or a randomly chosen actual word, etc. In another approach, the item modification component 906 can use a mapping table (e.g., a hash table) or mapping algorithm to map each sensitive item to an obfuscated item, and so on. A data store or stores 908 may store the mapping table or the operational parameters of the mapping algorithm.

In some cases, the item modification component 906 may generate obfuscations-made information, together with the OOD 112. The obfuscations-made information identifies the changes that have been made to the NOD 106 to produce the OOD 112, using one or more techniques. In one technique, for example, the item modification component 906 can create a file which maps original sensitive items to corresponding obfuscated items. For example, one entry in the obfuscation-made information can indicate that the sensitive item "August 2015" has been replaced with the random text "Hjus&s 333."

In another technique, the item modification component 906 can create a file which maps locations within the NOD 106 at which sensitive items appear, together with the sensitive items that have been removed from those locations; such a file can optionally omit information which describes the obfuscated items. For example, one entry in that file can indicate that the sensitive item "August 2015" appears at a prescribed text location within the page 504.

In another case, the item modification component 906 can add markers to the NOD 106 and/or the OOD 112. The makers may furthermore be preserved in the OTD 118. Each marker identifies a unit of sensitive content (e.g., a character, word, sentence, paragraph, etc.) in the NOD 106 that has been replaced with a sensitive item. The item modification component 906 can add that marker to the position in the document at which the sensitive item has been removed. In one case, the marker may not be visible to a reader by default, although the reader may be given the ability to make it visible by selecting an appropriate display setting, if so permitted.

In the above marker-related implementation, the obfuscations-made information may describe the relationships between markers and sensitive items, and/or among markers and sensitive items and obfuscated items. For example, the obfuscation-made information can contain a marker "Z001" associated with the obfuscation in FIG. 6 in which "August 2015" is replaced with the random text "Hjus&s 333." The NOD 106 and/or the OOD 112 can include that marker at the location within the page 504 at which the sensitive item ("August 2015") has been obfuscated.

The obfuscations-made information is optional in the sense that, in other implementations, the mapping table or algorithm of the item modification component 906 may be sufficient to reconstitute the sensitive items without a separate accounting for the changes that have been made.

In those cases in which the obfuscations-made information is produced, the obfuscation component 210 can store this information at various locations within the environment 102. In one case, the obfuscation component 210 can forward the obfuscations-made information to at least the de-obfuscation component 212, which enables the de-obfuscation component 212 to restore the sensitive items based on this information. In other cases, the obfuscation component 210 may append an encrypted version of the obfuscations-made information to one or more of the NOD 106, the OOD 112, etc. That encrypted obfuscations-made information may be retained in the OTD 118 that is produced by the worker entity and forwarded to the de-obfuscation component 212.

Figure 10:
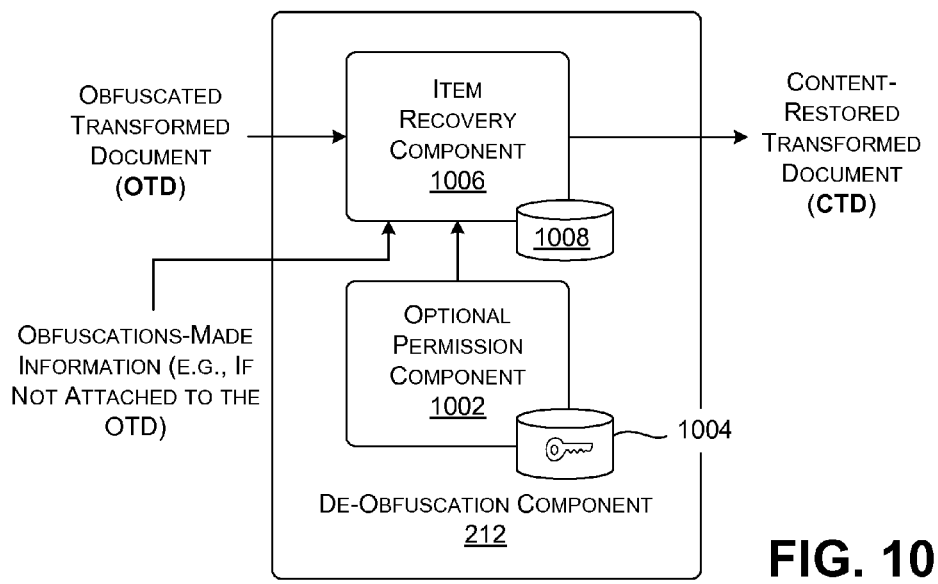
FIG. 10 shows one implementation of a de-obfuscation component, which is another component of the outsourcing tool of FIG. 2.

FIG. 10 shows one implementation of the de-obfuscation component 212, which is another component of the outsourcing tool 204 of FIG. 2. The de-obfuscation component 212 includes an optional permission component 1002 which determines whether the de-obfuscation component 212 has permission to convert the OTD 118 to the CTD 122. In one case, the permission component 1002 can make this decision by determining whether data store 1004 contains an appropriate decryption key for use in decrypting the encrypted obfuscations-made information, etc. Once permission to perform the conversion is granted, an item recovery component 1006 performs the actual task of converting the obfuscated items in the OTD 118 to the original sensitive items in the CTD 122 using a decrypted version of the obfuscations-made information.

In other cases, a data store 1008 may store a non-encrypted version of the obfuscations-made information, which it receives directly from the obfuscation component 210. The item recovery component 1006 can use the non-encrypted obfuscations-made information to convert the OTD 118 to the CTD 122.

In other cases, the item recovery component 1006 has access to the same mapping table or algorithm used by the item modification component 906 of the obfuscation component 210. The item recovery component 1006 can use that mapping information to convert the OTD 118 to the CTD 122, assuming that the mapping information is sufficient by itself perform the conversion (which is an assumption that may not be true in other cases).

As described above, in some cases, the outsourcing tool 2004 may prevent the worker entity from changing any content item in the OOD 112 for which he or she does not have permission to change. For example, the outsourcing tool 2004 may prevent the worker entity from changing the text "Launch Date: Hjus&s 3333" in the OOD 112, which may be accomplished by designating this text as a locked item. In other cases, the outsourcing tool 2004 may permit the worker entity to make limited changes to the content items. There is, however, a risk that a change made by a worker entity may corrupt an obfuscated item. That corruption, in turn, can potentially complicate the ability of the de-obfuscation component 212 to map the obfuscated item back to its sensitive item counterpart, depending on how the environment 102 accounts for the obfuscations that have been made. For example, in some cases, the obfuscated item may itself serve as a key to be used to find a corresponding sensitive item; corruption of the obfuscated item may therefore interfere with the ability of the item recovery component 1006 to find the correct sensitive item.

The item recovery component 1006 can use different strategies to address the above situation. In a first case, the item recovery component 1006 can use a similarity test to determine whether a modified obfuscated item is sufficiently similar to an original obfuscated item (as reflected in the obfuscations-made information). If the items are sufficiently similar, the item recovery component 1006 can substitute the corrupted obfuscated item with its presumed corresponding sensitive item counterpart.

In another case, as described above, the outsourcing tool can store change-history information that tracks each change made by the worker entity, or at least some of those changes. The item recovery component 1006 can consult the change-history information to determine the original form of a corrupted obfuscated item. The item recovery component can then substitute the corrupted obfuscated item with its presumed corresponding sensitive item counterpart. Or the item recovery component 1006 can display the change-history information to the outsourcing entity, which allows the outsourcing entity to manually examine and approve any restoration operation in question.

Figure 11:
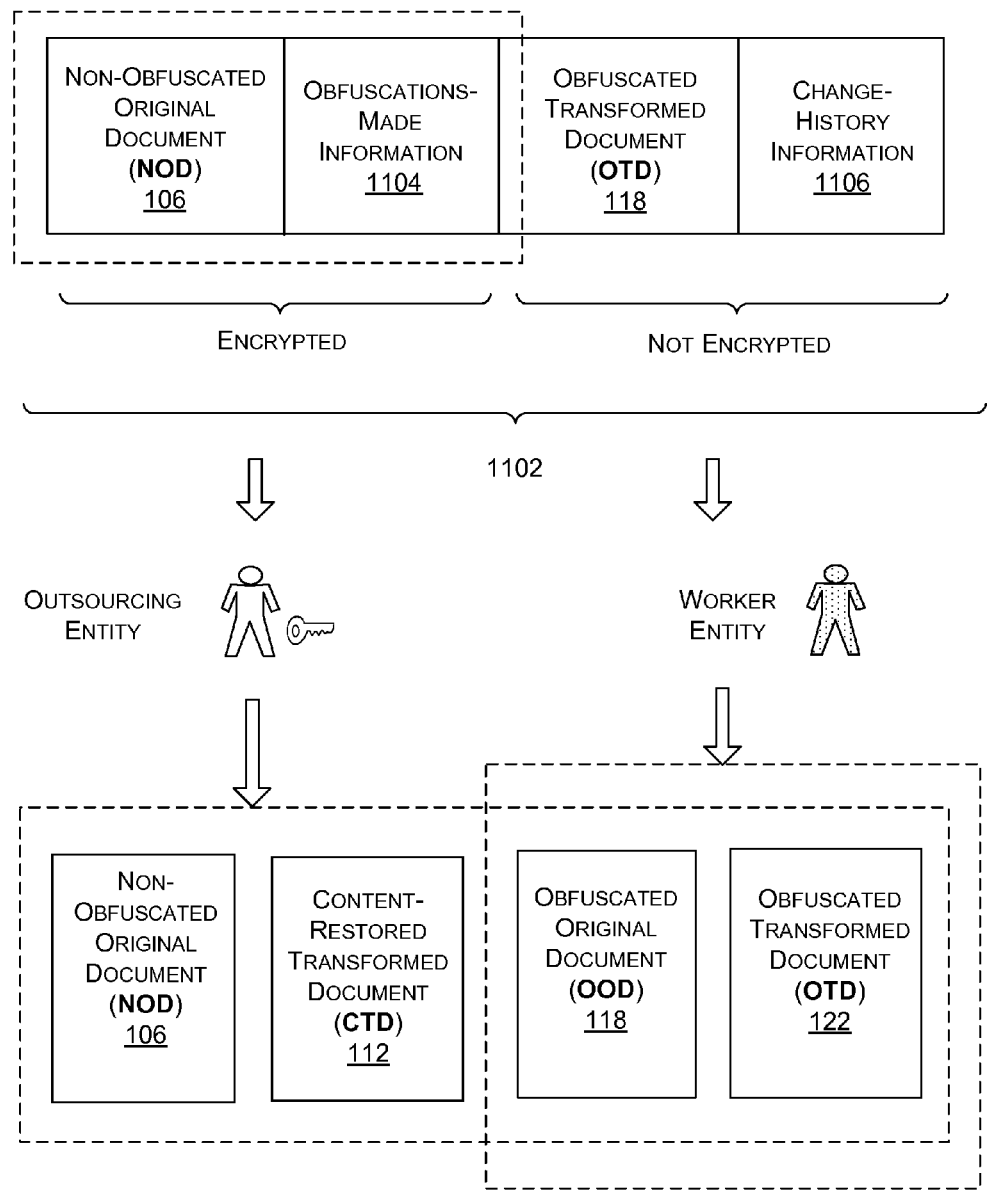
FIG. 11 depicts one strategy for controlling the presentation of non-obfuscated content and obfuscated content to an outsourcing entity and a worker entity, respectively.

FIG. 11 shows a bundle of information 1102 that may be available to various components of the outsourcing tool 204 following the changes made by the worker entity. That bundle of information 1102 may exist as an integrated data structure, or as separate information items. The bundle of information 1102 may be stored at one or more locations within the environment 102.

The bundle of information 1102 includes the NOD 106, the obfuscations-made information 1104, the OTD 118, and the change-history information 1106. The NOD 106 corresponds to the non-obfuscated original document. The obfuscations-made information identifies the changes made by the obfuscation component 210. The OTD 118 corresponds to the obfuscated transformed document produced by the worker entity. And the change-history information enumerates all of the changes made by the worker entity.

In one implementation, different instantiations of the outsourcing tool may be permitted to read different versions of the document being worked on, depending on whether they possess a decryption key. For example, the outsourcing entity's outsourcing tool is expected to possess the decryption key, enabling it to read all of the parts of the information 1102. In particular, the outsourcing entity's outsourcing tool can access both the NOD 106 and the OTD 118; it also can use the obfuscations-made information 1104 to convert the OTD 118 into the CTD 122. In contrast, the worker entity's outsourcing tool is expected to lack the decryption key. As such, even though it may have a de-obfuscation component, that component cannot successfully read the NOD 106 or the obfuscations-made information. Without access to the obfuscations-made information, the worker entity's outsourcing tool also cannot produce the CTD 122.

Again note that the implementation of FIG. 11 represents just one technique by which the environment 102 can prevent the dissemination of sensitive information. In another case, the de-obfuscation component 212 can receive the obfuscations-made information directly from the obfuscations component 210, which eliminates the need for encrypting and decrypting the obfuscations-made information. That is, in this latter case, the worker entity's outsourcing tool does not receive the obfuscations-made information in either encrypted or decrypted form.

B. Illustrative Processes

Figure 12:
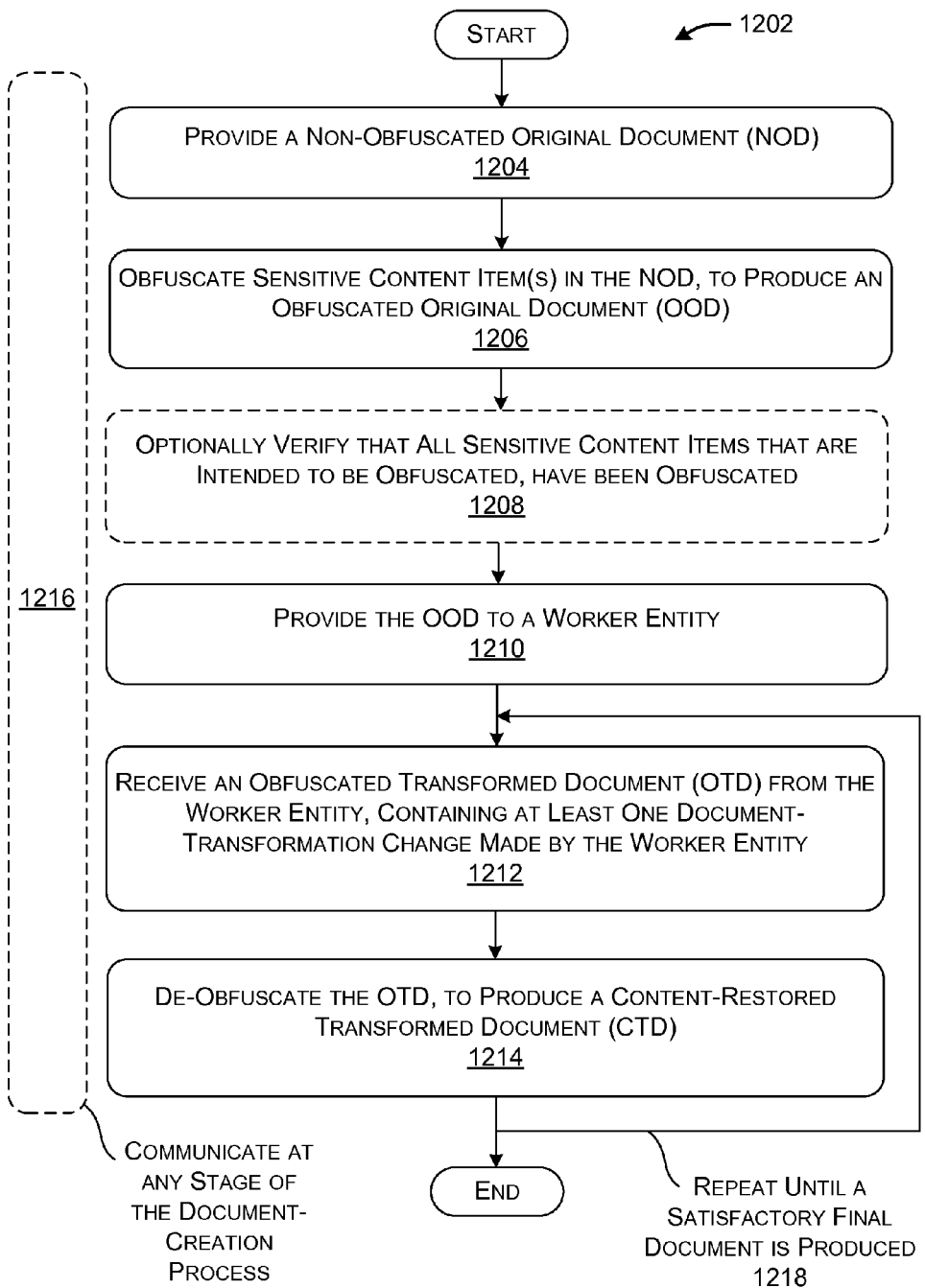
FIG. 12 is a flowchart that shows one manner of operation of the environment of FIG. 1, from the standpoint of an outsourcing entity.
Figure 13:
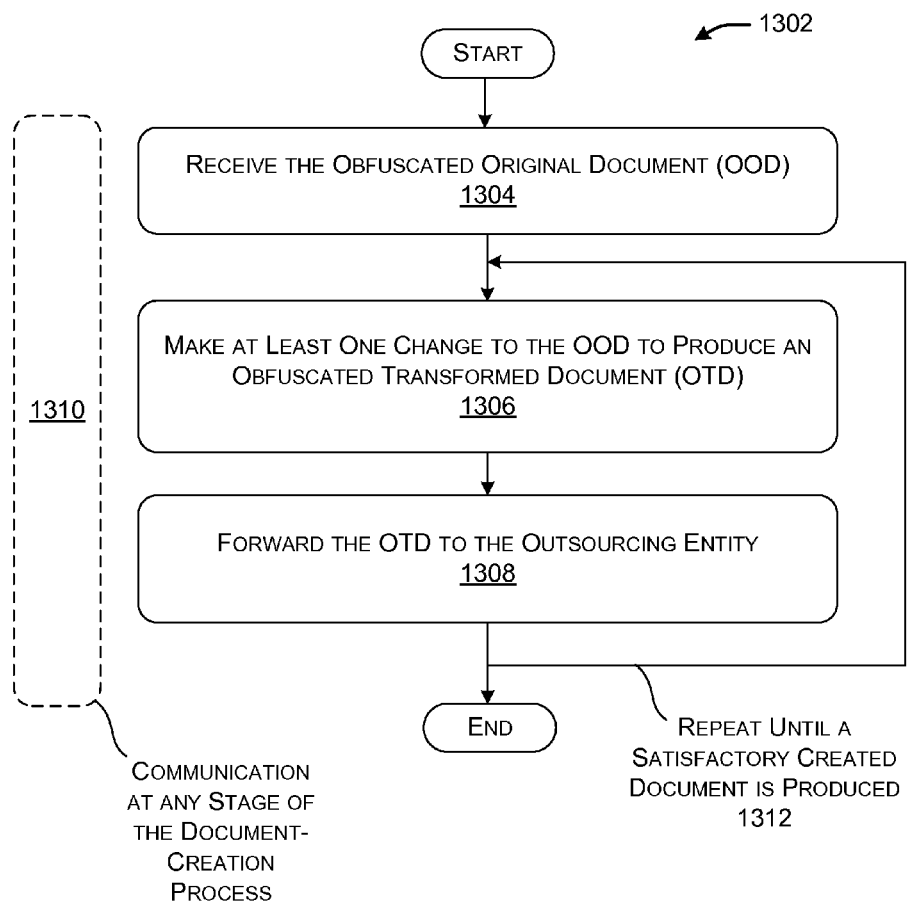
FIG. 13 is a flowchart that shows one manner of operation of the environment of FIG. 1, from the standpoint of a worker entity.

FIGS. 12 and 13 show processes that explain the operation of the environment 102 of Section A in flowchart form. Since the principles underlying the operation of the environment 102 have already been described in Section A, certain operations will be addressed in summary fashion in this section.

Starting with FIG. 12, this figure shows a process 1202 that describes one manner of operation of the environment 102 of FIG. 1, from the standpoint of an outsourcing entity. For example, at least some aspects of the process 1202 may be performed by an instance of an outsourcing tool that is available to the outsourcing entity. That outsourcing tool may hosted by a local client computing device and/or at least one remote computing system.

In block 1204, the environment 102 provides a non-obfuscated original document (NOD) 106 having one or more sensitive items 108 contained therein that are accessible to the outsourcing entity. In block 1206, the environment 102 obfuscates the sensitive items 108 in the NOD 106, to produce an obfuscated original document (OOD) 112 containing obfuscated items. In block 1208, the environment 102 optionally verifies that all sensitive content items that are intended to be obfuscated, have been obfuscated. In block 1210, the environment 102 provides the OOD 112 to a worker entity. In block 1212, the environment 102 receives an obfuscated transformed document (OTD) 118 from the worker entity. The OTD 118 contains at least one change made by the worker entity to the OOD 112. That change, in turn, contributes to the development of a final document. In block 1214, the environment 102 de-obfuscates the OTD 118 to produce a content-restored transformed document (CTD) 122.

Block 1216 indicates that, at any stage in the process of producing the final document, the outsourcing entity may communicate with the worker entity using one or more communication mechanisms. The loop-back path 1218 indicates that the worker entity can continue to make changes to the OTD 118, and the environment 102 can continue to convert the OTD 118, in its current state, into an instance of the CTD 122 for review by the outsourcing entity.

FIG. 13 is a process 1302 that shows one manner of operation of the environment 102 of FIG. 1, from the standpoint of a worker entity. For example, at least aspects of the process 1302 may be performed by an instance of a document creation tool and an outsourcing tool available to the worker entity. Those tools may be hosted by a local client computing device and/or at least one remote computing system.

In block 1304, the environment 102 receives the OOD 112 from the outsourcing entity. In block 1306, a document creation tool(s), under direction of the worker entity, makes at least one change to the OOD 12, to produce the OTD 118. In block 1306, the environment 102 forwards the OTD 118 to the outsourcing entity, or otherwise makes the OTD 118 available to the outsourcing entity. Block 1310 indicates that, at any stage in the process of producing the final document, the worker entity may communicate with the outsourcing entity using one or more communication mechanisms. The loop-back path 1312 indicates that the worker entity can continue to make changes to the OTD 118 upon instruction from the outsourcing entity.

FIGS. 12 and 13 where framed in the context of a serial flow of information, where the outsourcing entity and the worker entity are working on their respective versions of the document under development at different respective times. But in other cases, the environment 102 may allow the outsourcing entity and the worker entity to make changes in parallel. In addition, or alternatively, the processes (1202, 1302) of FIGS. 12 and 13 can be extended to the case in which plural worker entities work on parts of an OOD 112 provided by one or more outsourcing entities.

C. Representative Computing Functionality

FIG. 14 shows computing functionality 1402 that can be used to implement any aspect of the environment 102 set forth in the above-described figures. For instance, the type of computing functionality 1402 shown in FIG. 14 can be used to implement any client computing device of FIGS. 3 and 4, the remote system(s) 422 of FIG. 4, and so on. In all cases, the computing functionality 1402 represents one or more physical and tangible processing mechanisms.

The computing functionality 1402 can include one or more processing devices 1404, such as one or more central processing units (CPUs), and/or one or more graphical processing units (GPUs), and so on.

The computing functionality 1402 can also include any storage resources 1406 for storing any kind of information, such as code, settings, data, etc. Without limitation, for instance, the storage resources 1406 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1402. The computing functionality 1402 may perform any of the functions described above when the processing devices 1404 carry out instructions stored in any storage resource or combination of storage resources.

As to terminology, any of the storage resources 1406, or any combination of the storage resources 1406, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1402 also includes one or more drive mechanisms 1408 for interacting with any storage resource, such as a hard disk drive mechanism, an optical disk drive mechanism, and so on.

The computing functionality 1402 also includes an input/output module 1410 for receiving various inputs (via input devices 1412), and for providing various outputs (via output devices 1414). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a presentation device 1416 and an associated graphical user interface (GUI) 1418. Other output devices include a printer, a model-generating mechanism, a tactile output mechanism, an archival mechanism (for storing output information), and so on. The computing functionality 1402 can also include one or more network interfaces 1420 for exchanging data with other devices via one or more communication conduits 1422. One or more communication buses 1424 communicatively couple the above-described components together.

The communication conduit(s) 1422 can be implemented in any manner, e.g., by a local area network, a wide area network (e.g., the Internet), point-to-point connections, etc., or any combination thereof. The communication conduit(s) 1422 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1402 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, for creating a document in a collaborative manner, comprising:
   providing a non-obfuscated original document (NOD) that is accessible to an outsourcing entity, the NOD having one or more sensitive items contained therein;
   obfuscating said one or more sensitive items in the NOD, to produce an obfuscated original document (OOD) containing obfuscated items;
   providing the OOD to a plurality of worker entities to make changes to the OOD, the changes producing a plurality of obfuscated transformed document (OTD) parts;
   receiving the OTD parts from the worker entities, the OTD parts containing the changes made by the worker entities to the OOD; and
   assembling the OTD parts into an obfuscated transformed document (OTD);
   de-obfuscating the OTD by restoring the obfuscated items to their corresponding sensitive items, to produce a content-restored transformed document (CTD);
   sending an instruction from the outsourcing entity to one of the plurality of worker entities via a communication mechanism; and
   receiving an updated OTD from the worker entity receiving the instruction from the outsourcing entity, the updated OTD containing at least one additional change made by the worker entity to the OOD,
   said providing the NOD, obfuscating, providing the OOD, receiving, assembling, sending, and de-obfuscating being performed by one or more computing devices.

2. The method of claim 1, wherein the NOD corresponds to a document that is configured for presentation as a web page, or as a portion of a web page.

3. The method of claim 1, further including, after said obfuscating, verifying that all sensitive items that are intended to be obfuscated, have been obfuscated in the NOD.

4. The method of claim 1, wherein at least one of the changes affects a manner of presentation of information contained in the NOD, without affecting a semantic content of the information contained in the NOD.

5. The method of claim 1, further comprising preventing at least one of the worker entities from modifying at least a portion of the OOD.

6. The method of claim 1, wherein said one or more computing devices includes a first client computing device that is accessible to the outsourcing entity and a second client computing device that is accessible to at least one of the worker entities.

7. The method of claim 6, wherein the said obfuscating and de-obfuscating are performed by the first client computing device.

8. The method of claim 6, wherein the first client computing device hosts a first document creation tool for operating on documents available to the outsourcing entity, and the second client computing device hosts a second document creation tool for operating on documents available to at least one of the worker entities.

9. The method of claim 6, wherein said obfuscating and de-obfuscating are performed by at least one remote computing system, to which the first client computing device and the second client computing device are communicatively coupled.

10. The method of claim 9, wherein said at least one remote computing system also hosts a collaborative document creation tool that the outsourcing entity and the worker entities use to work on respective documents available to the outsourcing entity and the worker entities.

11. The method of claim 6, wherein:
    the first client computing device has access to an encryption key,
    the second client computing device does not have access to the encryption key,
    the first client computing device uses the encryption key to present the NOD and the CTD, and
    the second client computing device presents, in absence of possessing the encryption key, the OOD and the OTD.

12. A computing device comprising:
    a processor; and
    executable instructions operable by the processor, the executable instructions comprising a method for creating a document in a collaborative manner, the method comprising:

providing a non-obfuscated original document (NOD) that is accessible to an outsourcing entity, the NOD having one or more sensitive items contained therein;

obfuscating said one or more sensitive items in the NOD, to produce an obfuscated original document (OOD) containing obfuscated items;

providing the OOD to plurality of worker entities to make changes to the OOD, the changes producing a plurality of obfuscated transformed document (OTD) parts;

receiving the OTD parts from the worker entities, the OTD parts containing the changes made by the worker entities to the OOD; and assembling the OTD parts into an obfuscated transformed document (OTD);

de-obfuscating the OTD by restoring the obfuscated items to their corresponding sensitive items, to produce a content-restored transformed document (CTD);

sending an instruction from the outsourcing entity to one of the plurality of worker entities via a communication mechanism; and receiving an updated OTD from the worker entity receiving the instruction from the outsourcing entity, the updated OTD containing at least one additional change made by the worker entity to the OOD.

13. The computing device of claim 12, wherein at least one of the changes affects a manner of presentation of information contained in the NOD, without affecting a semantic content of the information contained in the NOD.

14. The computing device of claim 12, wherein the computing device represents a client computing device that is accessible to the outsourcing entity.

15. The computing device of claim 12, wherein the computing device represents a remote computing system that is accessible to both the outsourcing entity and the worker entities via respective client computing devices.

16. A computer readable storage medium for storing computer readable instructions, the computer readable instructions when executed by one or more processing devices perform a method for creating a document in a collaborative manner, the method comprising:

providing a non-obfuscated original document (NOD) that is accessible to an outsourcing obfuscating said one or more sensitive items in the NOD, to produce an obfuscated original document (OOD) containing obfuscated items;

providing the OOD to plurality of worker entities to make changes to the OOD, the changes producing a plurality of obfuscated transformed document (OTD) parts;

receiving the OTD parts from the worker entities, the OTD parts containing the changes made by the worker entities to the OOD; and assembling the OTD parts into an obfuscated transformed document (OTD);

de-obfuscating the OTD by restoring the obfuscated items to their corresponding sensitive items, to produce a content-restored transformed document (CTD)

sending an instruction from the outsourcing entity to one of the plurality of worker entities via a communication mechanism; and receiving an updated OTD from the worker entity receiving the instruction from the outsourcing entity, the updated OTD containing at least one additional change made by the worker entity to the OOD.

17. The computer readable storage medium of claim 16, wherein at least one of the changes includes a formatting-type change, in which at least one of the worker entities alters a format of the OOD.

18. The computer readable storage medium of claim 16, wherein the NOD corresponds to a document that is configured for presentation as a web page, or as a portion of a web page.

19. The computer readable storage medium of claim 16, wherein the method further comprises preventing at least one of the worker entities from modifying at least a portion of the OOD.

20. The computer readable storage medium of claim 16, wherein at least one of the changes affects a manner of presentation of information contained in the NOD.

* * * * *